(12) United States Patent
Yang

(10) Patent No.: US 11,438,141 B2
(45) Date of Patent: *Sep. 6, 2022

(54) METHOD AND SYSTEM FOR MANAGING CONSENT AND UTILIZATION OF INFORMATION USING BLOCKCHAIN

(71) Applicant: Piamond Corp., Busan (KR)

(72) Inventor: Jinhong Yang, Busan (KR)

(73) Assignee: Piamond Corp., Busan (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,932

(22) Filed: Dec. 10, 2020

(65) Prior Publication Data
US 2021/0119772 A1   Apr. 22, 2021

Related U.S. Application Data

(63) Continuation of application No. 16/867,682, filed on May 6, 2020, now Pat. No. 10,897,348.

(30) Foreign Application Priority Data

Jun. 17, 2019   (KR) .......................... 10-2019-0071299

(51) Int. Cl.
*G06F 15/16*   (2006.01)
*H04L 9/06*   (2006.01)
(Continued)

(52) U.S. Cl.
CPC .......... *H04L 9/0637* (2013.01); *G06F 9/547* (2013.01); *G06F 16/2379* (2019.01);
(Continued)

(58) Field of Classification Search
CPC ... H04L 9/0637; H04L 9/0819; H04L 9/0894; H04L 9/30; H04L 9/321; H04L 63/102;
(Continued)

(56) References Cited

U.S. PATENT DOCUMENTS 9,635,000 B1 *   4/2017   Muftic ................. H04L 9/3239
2002/0091568 A1   7/2002   Kraft et al.
(Continued)

FOREIGN PATENT DOCUMENTS

KR   10-2003-0077564 A   10/2003
KR      10-1590076 B1    2/2016
(Continued)

*Primary Examiner* — Atta Khan
(74) *Attorney, Agent, or Firm* — Faegre Drinker Biddle & Reath LLP

(57) ABSTRACT

An information management method and system for managing consent for and use of information using a blockchain are provided. The information management method comprises: receiving a request to store a user agreement to the processing of the user's information from a service provider providing a service to the user; recording the user agreement on a blockchain; providing the service provider a response to the request to store the user agreement; receiving a third-party certification request for the provision of information from the user, regarding the information provided to the service provider; and providing a third-party certification for the provision of information to the user.

13 Claims, 23 Drawing Sheets

(51) Int. Cl.

| | |
|---|---|
| *G06F 16/23* | (2019.01) |
| *G06F 16/27* | (2019.01) |
| *G06F 9/54* | (2006.01) |
| *H04L 9/40* | (2022.01) |
| *H04L 9/08* | (2006.01) |
| *H04L 9/30* | (2006.01) |
| *H04L 9/32* | (2006.01) |
| *H04L 9/00* | (2022.01) |

(52) U.S. Cl.
CPC ............ *G06F 16/27* (2019.01); *H04L 9/0819* (2013.01); *H04L 9/0894* (2013.01); *H04L 9/30* (2013.01); *H04L 9/321* (2013.01); *H04L 63/102* (2013.01); *H04L 9/50* (2022.05)

(58) Field of Classification Search
CPC . H04L 2209/38; G06F 16/27; G06F 16/2379; G06F 9/547
USPC .......................................................... 709/206
See application file for complete search history.

(56) References Cited

U.S. PATENT DOCUMENTS

2003/0023528 A1\* 1/2003 Wilce ................... G06Q 40/025
 705/38
2018/0341648 A1\* 11/2018 Kakavand ............... G06F 16/00

FOREIGN PATENT DOCUMENTS

| KR | 10-1916302 B1 | 11/2018 |
|---|---|---|
| KR | 10-2019-0008163 A | 1/2019 |

\* cited by examiner

FIG. 14

Register

User ID aaa1003@bbb.com

Your Name ccc

Password

● ● ● ●

Confirm Password

● ● ● ●

Next

FIG. 15

Register
Sign in to your account to continue.

☐ I agree to the purposes and definitions.

Thank you for using the service provided by Company Inc. AAA (hereinafter, 'Company')..................................................................

☐ I agree to the effect of the Terms and Conditions and changes made to them.

ⓘ The terms and conditions set forth herein are...............................

☐ I agree to the Regulations as well as the Terms and Conditions

ⓘ For matters not covered by the Terms and Conditions,.....................

| Back | Register |

FIG. 22

Information about stored agreement

Previous Block Num : None     Last Block Num : 5
Current Block Num : 4     Date and time of registration
                                               : 2020-03-06 17:45

☐ I agree to the purposes and definitions (No).

Thank you for using the service provided by Company Inc. AAA (hereinafter, 'Company')..........................................

☑ I agree to the effect of the Terms and Conditions and changes made to them (Yes).

① The terms and conditions set forth herein are...............................

☐ I agree to the Regulations as well as the Terms and Conditions (No)

① For matters not covered by the Terms and Conditions,........................

Service Provider Signature     User Signature

SQF0...     wUQN...     Verify

Confirm

FIG. 23

Information about stored agreement

Previous Block Num : 4  
Current Block Num : 5  
Last Block Num : 5  
Date and time of registration  
: 2020-03-06 18:05

☑ I agree to the purposes and definitions (Yes).

> Thank you for using the service provided by Company Inc. AAA (hereinafter, 'Company')..............................................

☑ I agree to the effect of the Terms and Conditions and changes made to them (Yes).

> ① The terms and conditions set forth herein are......................................

☑ I agree to the Regulations as well as the Terms and Conditions (Yes)

> ① For matters not covered by the Terms and Conditions,......................

Service Provider Signature  
Ujok...

User Signature  
FV8jfl...

Confirm

METHOD AND SYSTEM FOR MANAGING CONSENT AND UTILIZATION OF INFORMATION USING BLOCKCHAIN

CROSS REFERENCE TO RELATED APPLICATION APPLICATIONS

This application is a continuation of U.S. patent application Ser. No. 16/867,682, filed on May 6, 2020, which is based on and claims priority under 35 U.S.C. 119 to Korean Patent Application No. 10-2019-0071299, filed on Jun. 17, 2019, in the Korean Intellectual Property Office, the disclosures of which are herein incorporated by reference in their entireties.

BACKGROUND OF THE INVENTION

Field of the Invention

The present invention relates to a method and system for managing consent and utilization of information using blockchain.

Related Art

Currently, services relying on advertising based on users' information as their revenue source, such as online services and mobile apps, are using user's information for business purposes as a condition of service. For example, Korean Laid-Open Patent No. 10-2003-0077564 relates to a personalized profile-based advertising method, which discloses creating and providing an advertisement based on an individual user's profile involving the consumer's physical and geological location.

In that case, users provide their information to service providers pursuant to the terms and conditions of service by registering for a service or agreeing to the provision of information at the time of using the service.

Meanwhile, the General Data Protection Regulation (GDPR) clearly states in Recital 42 regarding consent for the provision of personal data that "Where personal data processing is based on the data subject's consent, the data processor should be able to demonstrate that the data subject has given consent to the processing operation. The user's consent to the provision of personal data occurs under the following circumstances (1) to (4):

(1) The user agrees to the terms and conditions when registering for a service or using the service;

(2) The terms and conditions to which the user agreed as a condition for registering for or using the service are changed;

(3) The scope of personal data which the user agrees to its provision varies at the time of the user's consent (when there are a variety of mandatory and optional conditions); and (4) Individual consents are given depending on the scope or type of service use, as well as at the time of registration (when individual permissions are requested at the time of service use).

Accordingly, the management of various personal data is required under such various circumstances when consent is given. For example, (1) and (2) require a clear record of information about the terms and conditions at the time, (3) requires a clear record of the scope of personal data provision the user agreed to at the time, and (4) requires the service provider to manage records of user consent on a daily basis or term basis (one-time, permanent, etc.) depending on requests.

However, even though the user agrees to give the service provider the authority to use their personal data via a variety of routes or methods, there have been no methods of explicitly recording, managing, and checking consent. Thus, in case of a problem with personal data use, there exists no certification data which can be the basis for information on the consent given at the time of registration and information on the terms and conditions of service use at that time.

SUMMARY OF THE INVENTION

The present invention provides a information management method for managing consent for and use of information using a blockchain, a computer device for carrying out the method, a computer program connected to the computer device and stored in a computer-readable recording medium to execute the method on the computer device, and the computer-readable recording medium.

The present invention provides a information management method that allows a service provider to demonstrate whether a user has given consent to the processing of information by managing consent for and use of the user's information using a reliable blockchain technology of a trust provider, a computer device for carrying out the method, a computer program connected to the computer device and stored in a computer-readable recording medium to execute the method on the computer device, and the computer-readable recording medium.

An exemplary embodiment of the present invention provides a information management method for a computer device comprising at least one processor, the method comprising: receiving a request to store a user agreement to the processing of the user's information from a service provider providing a service to the user by the at least one processor; recording the user agreement on a blockchain by the at least one processor; providing the service provider a response to the request to store the user agreement, by the at least one processor; receiving a third-party certification request for the provision of information from the user, regarding the information provided to the service provider, by the at least one processor; and providing a third-party certification for the provision of information to the user, by the at least one processor.

According to one aspect, the information management method may further comprising: providing a function for looking up transactions recorded on the blockchain, by the at least one processor.

According to another aspect, in the providing of the look up function, at least one among an API for looking up transactions recorded on the blockchain, a page, a URL (uniform resource locator) for accessing the page, and a code may be provided as a service by the service provider or provided to the user.

According to still another aspect, the information management may further comprising: issuing the service provider a key for each user or for each section of the user agreement, by the at least one processor, wherein a transaction for recording the user agreement on the blockchain is created using the issued key.

According to a further aspect, the information management may further comprising: applying a form integration function to the user agreement, by the at least one processor, wherein the form integration function comprises a function for integrating different forms of user agreement in a web service, API, mobile app, etc.

According to a further aspect, the information management may further comprising: retrieving a data use instance included in API call information, in response to an API call request for a service by the service provider, by the at least one processor; determining the legitimacy of a transaction creation request from the service provider and recording the data use instance using an API if the request is legitimate, by the at least one processor; invoking a target API required for the service by the service provider, by the at least one processor.

According to a further aspect, the information management may further comprising: testing the legitimacy of the user agreement recorded on the blockchain by comparing the user agreement recorded on the blockchain and the provided information for which the third-party certification was granted, by the at least one processor.

According to a further aspect, in the receiving of the storage request, the user agreement encrypted with a block key may be received from the service provider, and, in the providing of the response to the service provider, the identifier of the block corresponding to the user agreement recorded on the blockchain may be returned to the service provider.

According to a further aspect, the service provider may encrypt the block key with a public key of the user and transmit the encrypted block key and the returned block identifier to the user, and the user may restore the encrypted block key with a private key of the user and look up the user's agreement from the trust provider by using the block identifier and the restored block key.

According to a further aspect, in the receiving of the storage request, a signature of the service provider signed on the user agreement with a private key of the service provider and a signature of the user signed on the user agreement with the private key of the user may be received, and, in the providing of the third-party certification, the third-party certification for the provision of information may be provided by using the signature of the service provider and the signature of the user.

Another exemplary embodiment of the present invention provides a information management method for a computer device comprising at least one processor, the method comprising: requesting a user for the user's information required to use a service, by the at least one processor; creating and providing a trust provider selection page in response to a trust provider association page from the user, by the at least one processor; identifying a trust provider selected through the trust provider selection page by the at least one processor; requesting the identified trust provider to store a user agreement to the processing of the user's information, by the at least one processor; and granting the user the right to use the service according to a response from the trust provider, by the at least one processor.

Another exemplary embodiment of the present invention provides a computer program connected to a computer device and stored in a computer-readable recording medium to execute the method on the computer device.

Another exemplary embodiment of the present invention provides a computer-readable recording medium storing a computer program for executing the method.

Another exemplary embodiment of the present invention provides a compute device comprising at least one processor configured to execute computer-readable instructions, wherein a request to store a user agreement to the processing of the user's information is received from a service provider providing a service to the user, by the at least one processor; the user agreement is recorded on a blockchain, by the at least one processor; a response to the request to store the user agreement is provided to the service provider, by the at least one processor; a third-party certification request for the provision of information is received from the user, regarding the information provided to the service provider, by the at least one processor; and a third-party certification for the provision of information is provided to the user by the at least one processor.

It is possible for a service provider to demonstrate whether a user has given consent to the processing of information by managing consent for and use of the user's information using a reliable blockchain technology of a trust provider, a computer device for carrying out the method, a computer program connected to the computer device and stored in a computer-readable recording medium to execute the method on the computer device, and the computer-readable recording medium.

BRIEF DESCRIPTION OF THE DRAWINGS

FIG. 14 is a view illustrating an example of a registration page according to an exemplary embodiment of the present invention.

FIG. 15 is a view illustrating an example of a page for agreement to terms and conditions according to an exemplary embodiment of the present invention.

FIGS. 22 and 23 are views illustrating an agreement to initial terms and conditions and an agreement to changed terms and conditions according to an exemplary embodiment of the present invention.

DESCRIPTION OF EXEMPLARY EMBODIMENTS

The present invention may be variously changed, and may have various embodiments, and specific embodiments will be described in detail below with reference to the attached drawings.

In describing the present invention, when it is determined that the detailed description of the publicly known art related to the present invention may obscure the gist of the present invention, the detailed description thereof will be omitted.

An information management system according to exemplary embodiments of the present invention may be implemented by at least one computer device. A computer program according to an exemplary embodiment of the present invention may be installed and run on the computer device, and the computer device may carry out an information management method according to an exemplary embodiment of the present invention under control of the computer program being run. The aforementioned computer program may be connected to the computer device and stored in a computer-readable recording medium to execute the information management method on the computer device.

Figure 1:
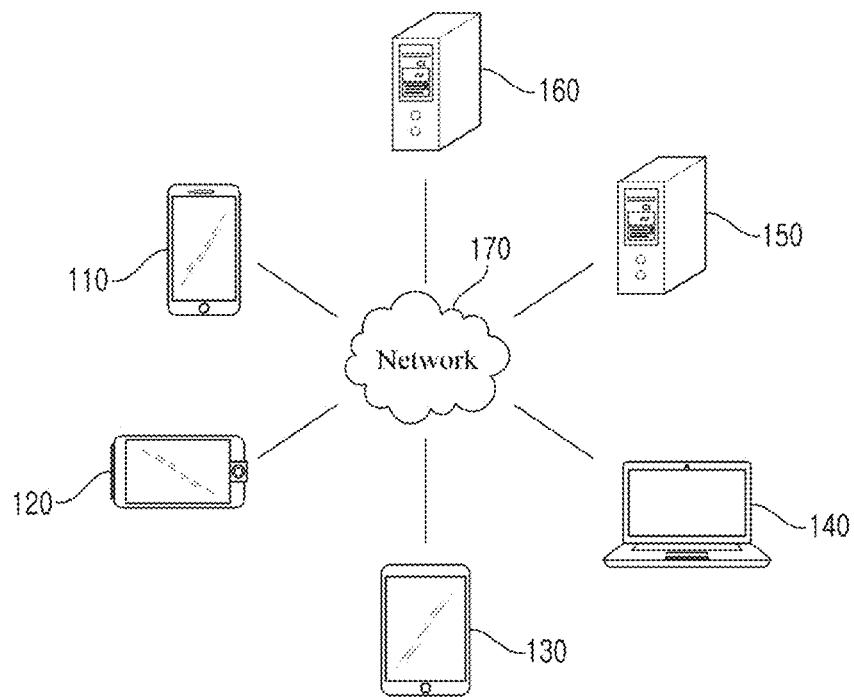
FIG. 1 is a view illustrating an example of a network environment according to an exemplary embodiment of the present invention.

FIG. 1 is a view illustrating an example of a network environment according to an exemplary embodiment of the present invention. The network environment of FIG. 1 shows an example including a plurality of electronic devices 110, 120, 130, and 140, a plurality of servers 150 and 160, and a network 170. FIG. 1 is an example for explaining the invention, and the number of electronic devices or the number of servers is not limited to what is shown in FIG. 1. Also, the network environment of FIG. 1 is only an example of environments applicable to the present exemplary embodiments, and the environments applicable to the present exemplary embodiments are not limited to the network environment of FIG. 1.

The plurality of electronic devices 110, 120, 130, and 140 may be fixed terminals or mobile terminals implemented as computer devices. The plurality of electronic devices 110, 120, 130, and 140 may include a smartphone, a mobile phone, a navigation device, a computer, a laptop, a digital broadcasting terminal, a personal digital assistant (PDA), a portable multimedia player (PMP), a tablet PC, a smart TV, and a connected car dashboard, for example. Although the first electronic device 110 of FIG. 1 takes the form of a smartphone, for example, it may represent one of various physical computer devices that can communicate with other electronic devices 120, 130, and 140 and/or the servers 150 and 160 over the network 170 virtually by using a wireless or wired communication method.

The communication method is not limited and may include near field communication between devices, as well as communications using a communication network (for example, a mobile communication network, wired Internet, wireless Internet, and a broadcasting network) in which the network 170 may be included. For example, the network 170 may include one or more networks among a personal area network (PAN), a local area network (LAN), a campus area network (CAN), a metropolitan area network (MAN), a wide area network (WAN), a broadband network (BBN), and the Internet. Also, the network 170 may include, but not limited to, one or more network topologies including a bus network, a star network, a ring network, a mesh network, a star-bus network, and a tree or hierarchical network.

Each of the servers 150 and 160 may be configured as a computer device or a plurality of computer devices that provide instructions, codes, files, content, services, and the like, through communication with the plurality of electronic devices 110, 120, 130, and 140 over the network 170. For example, the server 150 may be a system that provides service (for example, a video call service, a financial service, a payment service, a social network service, a messaging service, a search service, a mail service, and a content providing service) to the plurality of electronic devices 110, 120, 130, and 140 over the network 170.

Figure 2:
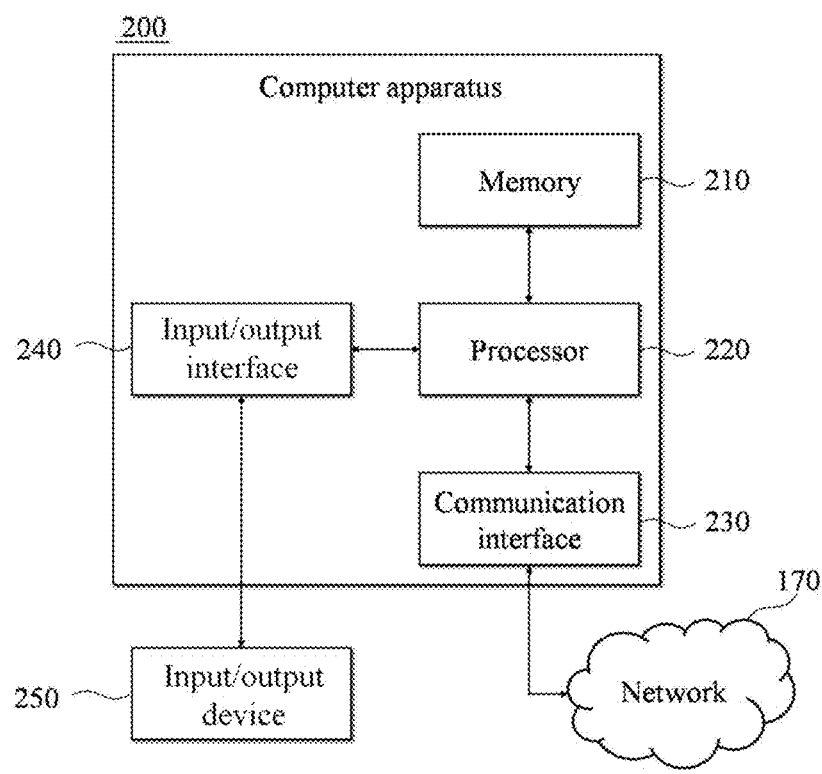
FIG. 2 is a block diagram illustrating an example of a computer device according to an exemplary embodiment of the present invention.

FIG. 2 is a block diagram illustrating an example of a computer device according to an exemplary embodiment of the present invention. Each of the plurality of electronic devices 110, 120, 130, and 140 or each of the servers 150 and 160 may be configured through a computer device 200 of FIG. 2. A method according to exemplary embodiments of the present invention may be performed by the computer device 200.

As illustrated in FIG. 2, the computer device 200 may include a memory 210, processor 220, a communication interface 230, and an input/output interface 240. The memory 210 is a computer-readable recording medium, and may include a permanent mass storage device, such as random access memory (RAM), read only memory (ROM), and a disk drive. Here, the permanent mass storage device, such as ROM and a disk drive, is a separate permanent storage device which is distinct from the memory 210, and may be included in the computer device 200 Also, an operating system and at least one program code may be stored in the memory 210. Such software components may be loaded onto the memory 210 from another computer-readable recording medium separate from the memory 210. Such a separate computer-readable recording medium may include a computer-readable recording medium such as a floppy drive, a disk, a tape, a DVD/CD-ROM drive, a memory card, etc. According to other exemplary embodiments, the software components may be loaded onto the memory 210, not through a computer-readable recording medium but through the communication interface 230. For example, the software components may be loaded onto the memory 210 of the computer device 200 based on a computer program installed by files received over the network 170.

The processor 220 may be configured to process computer program instructions by performing basic arithmetic, logic, and input/output operation. The instructions may be provided to the processor 220 by the memory 210 or the communication interface 230. For example, the processor 220 may be configured to execute the instructions received according to a program code stored in a recording device such as the memory 210.

The communication interface 230 may provide a function for communication between the computer device 200 and other devices (e.g., the aforementioned storage devices) over the network 170. In an example, a request, instruction, data, file, etc. generated by program code stored in a recording device such as the memory 210 may be transmitted to other devices over the network 170 under control of the communication interface 230. Inversely, a signal, instruction, data, file, etc. from other devices may be received by the computer device 200 through the communication interface 230 of the computer device 200 over the network 170. The signal, instruction, data, etc. received through the communication interface 230 may be transmitted to the processor 220 or memory 210, and the file or the like may be stored in a storage medium (the above-mentioned permanent storage device) the computer device 200 may further comprise.

The input/output interface 240 may be a means for interfacing with an input/output device 250. For example, the input device may include a microphone, a keyboard, a camera, or a mouse, and the output device may include a device like a display or speaker. In another example, the input/output interface 240 may be a means for interfacing with a device like a touchscreen whose input and output functions are integrated. The input/output device 250, together with the computer device 200, may be configured as one device.

In other exemplary embodiments, the computer device 200 may comprise fewer or more components than the one shown in FIG. 2. However, there is no need to clearly illustrate most of the components according to the related art. For example, the computer device 200 may comprise at least some of the aforementioned input/output devices 250, or may further comprise other components, such as a transceiver, a database (DB), etc.

Figure 3:
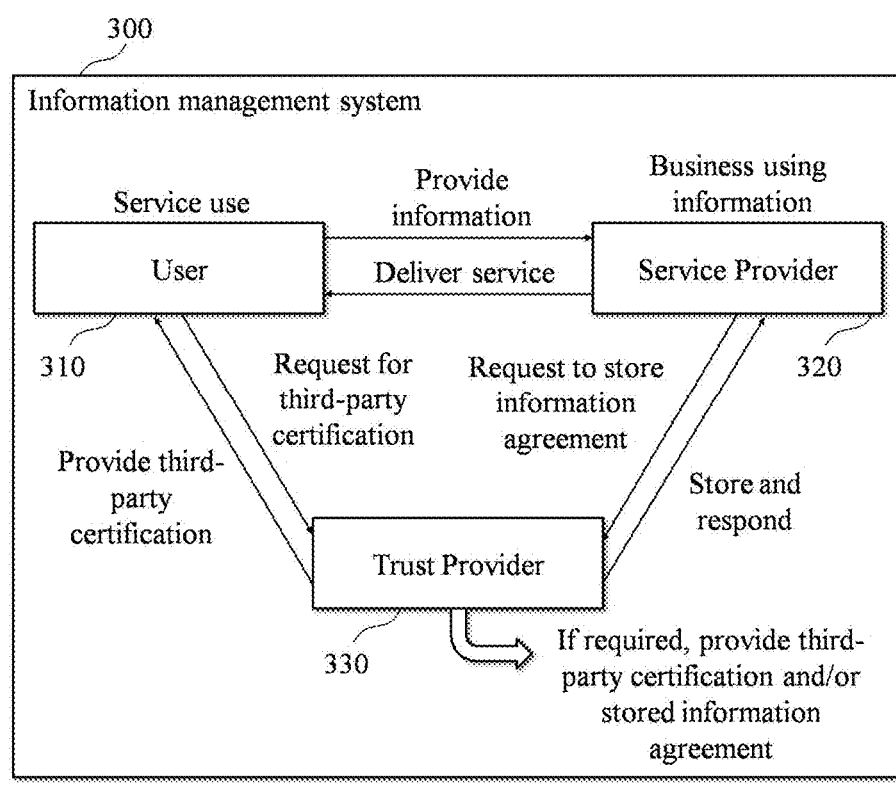
FIG. 3 is a view illustrating an example of a management system according to an exemplary embodiment of the present invention.

FIG. 3 is a view illustrating an example of a management system according to an exemplary embodiment of the present invention. The management system 300 according to this exemplary embodiment may comprise a user 310, a service provider 320, and a trust provider 330.

The user 310 is an entity who registers for a service to use or interact with the service or who delegates authority, which may refer to the actual owner of data. More specifically, the user 310 may correspond to a trustor who has an account for a service provided by the service provider 320 or who wants to use the service provided by the service provider 320. In this case, every entity who uses the service one time or temporarily or permanently may be the user 310. Here, the information may comprise personally identifiable information (PII) and/or potential personally identifiable information (PPII).

The service provider 320 is an entity who runs a business with the authority to use data from the user 310 as a reward for their service, which may correspond to a service provider who provides the service to the user 310 or a data processor who uses the user's 310 data. In more concrete examples, the service provider 320 may generally include an Internet service provider (ISP), an app service provider, a Dapp service provider, a smart contract service provider, and/or an Internet-of-Things (IoT) service provider, but every entity that uses the information of the user 310 may be virtually the service provider 320. For example, an entity that provides offline service such as an insurance company's service, a financial service, a local government's public service and also provides an online function for prompting the user to give consent to data use or matters concerning authority delegation may be the service provider 320. In this case, voice information or the like relating to consent for data may be stored and managed in a blockchain through a trust provider 330 to be described later, based on an ARS system or wired/wireless phone environment. In another example, according to the General Data Protection Regulation (GDPR), a controller and a processor may be the service provider 320.

The trust provider 330 may include an open application program interface (API) provider who provides a third-party trustor's user right management based on a blockchain. For example, an application or web service or an IoT device as the trust provider 330 may be provided with an external organization certification function for information about user consent and permission agreement at the time of the user's registration for or use of the service, by using the third-party trustor's user right management through API calls.

As such, the trust provider 330 may correspond to an entrepreneur who provides a third-party service for securely storing and managing the information the user 310 provides to the service provider 320 as a reward for using the service, with consent from the user 310 and the service provider 320.

The user 310 may provide information to the service provider 320, and the service provider 320 may deliver the service to the user 310. In this case, the user 310 may use the delivered service, and the service provider 320 may conduct business by using the user's information.

In this case, the user 310 may request the trust provider 330 for third-party certification for the provision of information to the service provider, i.e., service provider 320, and the trust provider 330 may provide the user 310 a third-party certification for the provision of information in response to the request.

Similarly, the service provider 320 may request the trust provider 330 to store an agreement for pertinent information at the time when the user 310 gives consent for data, and the trust provider 330 may store the information agreement and then provide a response to the service provider 320.

The third-party certification and the stored information agreement may be used as evidentiary material when a problem with the processing of information occurs later. For example, upon a request from a government organization or the like that seeks to deal with a problem in relation to information processing, the trust provider 330 may provide the third-party certification and/or the stored information agreement to the government organization.

The trust provider 330 may provide the following functions (1) to (3):

(1) Encryption Function

The trust provider 330 may provide an encryption function for all stored data. Whether the trust provider 330 possesses a private key for encryption or not may depend on the method of service provision. For example, if the user 310 or the service provider 320 encrypts data with a private key and then makes a request for certification of the data, the trust provider 330 does not have to possess a private key. On the other hand, the trust provider 330 may possess a private key in case the trust provider 330 has to do additional encryption on received data.

(2) Transaction-Related Trails

Upon a request to store instances relating to data and upon an inquiry about the stored instances, the trust provider 330 may provide a function for recording information on the entity that has made the storage request, the entity that has inquired about the instances, and all related events, and providing the recorded information. For certification of transaction-related trails, the transaction-related trails may be recorded on the same blockchain that stores the instances relating to data or on a separate blockchain, depending on the type of service.

(3) Form Integration (Consent/Agreement Information Integration)

The trust provider 330 may provide a function for easily retrieving user consent/agreement information collected on a web form or mobile app. This is for easily interfacing with user consent/agreement information because multiple service providers provide service using a webform or mobile app. In an example, a web form may have a JavaScript library encryption module for retrieving relevant data. Also, a mobile app may have a software development kit (SDK) and APIs for retrieving relevant data from a native app. An API-based mobile app may support the integration of services, like audio (e.g., smart/artificial intelligence speakers) or IoT device services, that are difficult to access through a user interface or have a one-time permission feature.

The above-described user 310, service provider 320, and trust provider 330 may virtually represent physical devices the user 310, service provider 320, and trust provider 330 are operating, and these physical devices may be implemented by the computer device 200 explained previously with reference to FIG. 2. In this specification, operations performed by the user 310, service provider 320, and trust provider 330 may correspond to operations performed by the processor 220 included in the computer device 200 that implement these entities.

Figure 4:
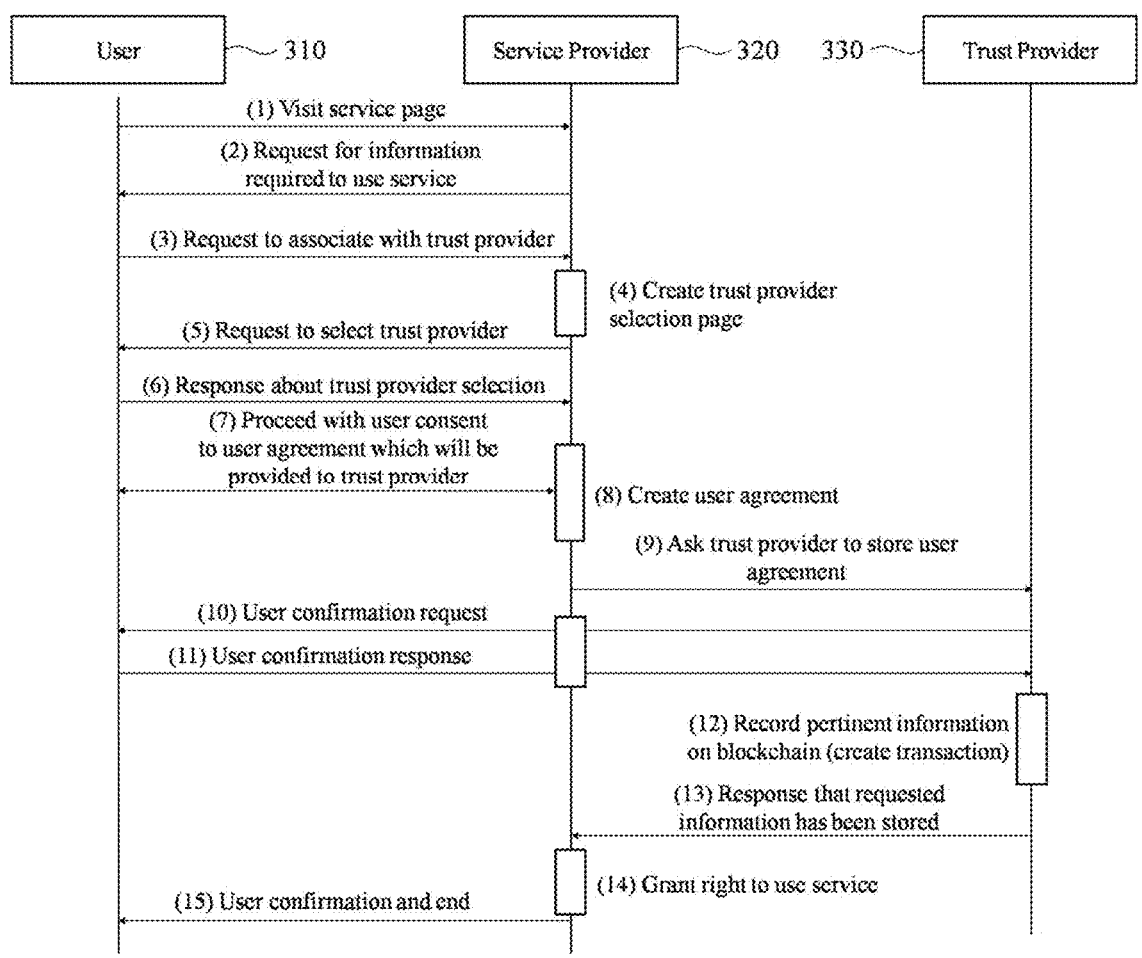
FIG. 4 is a flowchart illustrating an example of a service process according to an exemplary embodiment of the present invention.

FIG. 4 is a flowchart illustrating an example of a service process according to an exemplary embodiment of the present invention. This figure is a drawing of an example of a service process between the user 310, service provider 320 and trust provider 330.

In the process (1), the user 310 may visit a service page for a service provided by the service provider 320. The service provider 320 may be one of entities who provide their service (hereinafter, "service provider service") to users online and/or by using a mobile app or the like. In other words, although there may be multiple service providers, FIG. 4 explains a process in which the user 310 wants to get a service provider service from the service provider 320.

In the process (2), the service provider 320 may ask the user 310 for information required for them to use the service. As explained previously, the information may comprise personal identifiable information and/or potential personal identifiable information. In an example, if the service provider 320 requires the user 310 to log in, in order to provide a service provider service, the service provider 320 may ask the user 310 for information (for example, ID and password) required for login. The information the user 310 is required to provide may vary depending on the service provider service.

In the process (3), the user 310 may ask the service provider 320 to associate with a trust provider. Associating with a trust provider may mean getting a trusts provider service through one of trust provider services provided by multiple entrepreneurs. There may be multiple trust provider services provided by multiple entrepreneurs, and the trust provider 330 of FIG. 4 may be an entity who provides a trust provider service the user 310 selects from the multiple trust provider services. The subsequent steps (4) to (6) may explain an example of a process for the user 310 to select the trust provider 330.

In the process (4), the service provider 320 may create a trust provider selection page. The service provider 320 may create a priority trust provider selection page according to the request made by the user 310 in the process (3). The trust provider selection page may comprise information about multiple trust provider services or the entrepreneurs of the multiple trust provider services, and may comprise a user interface for selecting one of the multiple trust provider services or one of the entrepreneurs of the multiple trust provider services.

In the process (5), the service provider 320 may ask the user 310 to select a trust provider. For example, the service provider 320 may ask the user 310 to select one of the multiple trust provider services or one of the entrepreneurs of the multiple trust provider services through the trust provider selection page.

In the process (6), the user 310 may give a response to the service provider 320 about trust provider selection. For example, if the user 310 selects one of the multiple trust provider services or one of the entrepreneurs of the multiple trust provider services via a user interface included in the trust provider selection page, information about the selected trust provider service or selected entrepreneur may be transmitted to the service provider 320 through the trust provider selection page. FIG. 4 explains an example of selecting the trust provider 330.

In the process (7), the user 310 and the service provider 320 may proceed with user consent to the provision of a user agreement to a trust provider. Here, the trust provider may correspond to the trust provider 330 selected in the process (6). The user consent may comprise consent to the processing of information required to use the requested service. In this case, the process (7) may be carried out in such a manner that the service provider 320 asks the user 310 for user consent and the user 310 gives a response to the request from the service provider 320.

In the process (8), the service provider 320 may create a user agreement.

In the process (9), the service provider 320 may ask the trust provider 330 to store the user agreement. In this case, the service provider 320 may transmit information about the user 310, information about the service provider 320, and the user agreement to the trust provider 330.

In the process (10), the service provider 320 may ask the user 310 for user confirmation. For example, the service provider 320 may ask for confirmation that the user agreement created by user consent will be stored in the trust provider 330.

In the process (11), the user 310 may give a response to the user confirmation request from the service provider 320. In this case, if the service provider 320 controls the user 310's user interface (UI)/user experience (UX), the procedure of the user confirmation request and user confirmation response may be done on the service page of the service provider 320.

In the process (12), the trust provider 330 may record pertinent information on a blockchain. In other words, the trust provider 330 may record information about the user 310, information about the service provider 320, and the user agreement, which are provided by the service provider 320, on the blockchain.

In the process (13), the trust provider 330 may give a response to the service provider 320 that the requested information has been stored.

In the process (14), the service provider 320 may grant the user 310 the right to use the service. In other words, the service provider 320 may grant the user 310 the right to use the service by asking for information required to use the service, receiving a user agreement to the processing of information, and then transmitting the user agreement to the trust provider 330 selected by the user 310 to store the user agreement on the blockchain.

In the process (15), the service provider 320 may get user confirmation, and then the service process may be ended. In other words, the service provider 320 may have the user 310 confirm that the service agreement has been stored through the trust provider 330 and the user 310 is granted the right to use the service.

Figure 5:
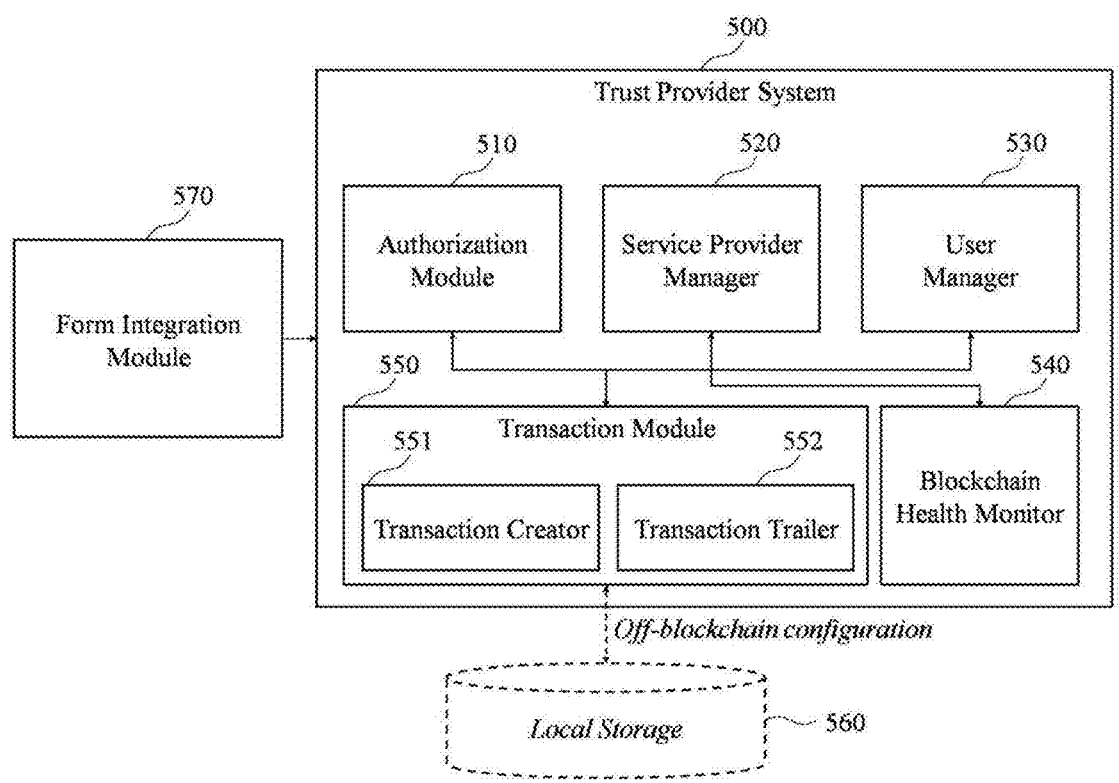
FIG. 5 is a view illustrating an example of an internal configuration of a trust provider according to an exemplary embodiment of the present invention.

FIG. 5 is a view illustrating an example of an internal configuration of a trust provider according to an exemplary embodiment of the present invention. A trust provider system 500 may correspond to the above-explained trust provider 330, and, as illustrated in FIG. 5, may comprise an authorization module 510, a service provider manager 520, a user manager 530, a blockchain health monitor 540, and a transaction module 550.

The authorization module 510 may provide an authorization function for authorizing the service provider 320 and managing records requested by web services, APIs, mobile apps, etc. The service provider 320 may get a key issued by using the authorization module 510 in order to use a service. Using this key, it is possible to create and look up transactions.

The service provider manager 520 may provide information concerning the service provider 320's service registration, key issuance, and/or transaction trail. In an example, in a case where this service is provided on a pay-per-charge basis, the volume and/or number of transactions may be obtained through the transaction trail provided by the service provider manager 520, and charging information may be generated based on the volume and/or number of transactions.

The user manager 530 may provide the user 310's user consent and/or permission agreement. If the user 310 uses the trust provider 330 by registering for their service, the user manager 530 may provide a function for monitoring the user 310's transaction trail for the entire service.

The blockchain health monitor 540 may serve to manage the health of a blockchain that records transactions. For example, the blockchain health monitor 540 may provide a function for monitoring the level of reliability of the blockchain. In this case, a consensus algorithm (mechanism/protocol), the total number of nodes in the blockchain, information on the blockchain creation cycle, and/or information on the blockchain creation entity may be used as indicators for determining the level of reliability. A hybrid blockchain or multi-blockchain may be extensively applied to determine the level of reliability of a connected blockchain.

The transaction module 550 may use different forms of blockchain to record transactions. For example, a proof-of-work (POW)-based blockchain service or proof-of-stake (POS)-based blockchain service may be used as the consensus algorithm. In an example, Ethereum or Hyperledger Fabric may be used. It should be noted that conditions (total number of nodes, blockchain creation cycle, blockchain creation entity, and volume of transactions) for reliability and service need to be taken into consideration regardless of the form of the blockchain. As illustrated in FIG. 5, the transaction module 550 may comprise a transaction creator 511 and a transaction trailer 552.

The transaction creator 551 may serve to create the content of user consent/agreement/permission, provided with consent from the service provider 320 and the user 310, on the blockchain. In an example, if the user's explicit agreement activity occurs through a form integrator at the time when the service provider 320 asks the user 310 for information, a request may be made to the trust provider 330 from the service provider 320's service. At that point, a transaction inquiry URL (uniform resource locator) or code for the user 310 may be created, and the transaction creator 551 may provide a function for providing the created URL or code as a service by the service provider 320 or transmitting it directly to the user 310 (for example, via email, push notifications, messaging, etc.). The transaction creator 551 may take the form of off-blockchain depending on the number of transactions and the volume of stored data, in which case the entire content may be encrypted and recoded on an external local storage 560, and any corresponding records, hash values, etc. may be recorded as transactions on a reliable blockchain.

The transaction trailer 552 may provide a function for monitoring inquiries about information stored on a blockchain. To ensure the reliability of the content of a trail log, the information inquiries may be recorded as transactions.

The form integration module 570 may provide a function for integrating different forms in a web service, API, mobile app, etc. A web service may provide a JavaScript-based framework for recording user information collected through a web UI/UX (e.g., checkbox, radio button, etc.). Any records of this information need to be shown on transactions by using metadata tags, in addition to existing HTML tags. Also, the form integration module 570 may provide a function for keeping records of use of information by invoking the trust provider 330 by proxy if user consent or permission is required for an API call. If user consent is required when any of the functions of the service provider 320 not included in the terms and conditions or a 3rd party's function is invoked, an API that invokes the trust provider 330 by proxy may be used. A service process for the API call will be described in further details below with reference to FIG. 6. Meanwhile, the form integration module 570 may provide a function for a mobile app to collect terms and conditions information and/or user consent/agreement information adapted to a native app development environment of a mobile operating system.

Figure 6:
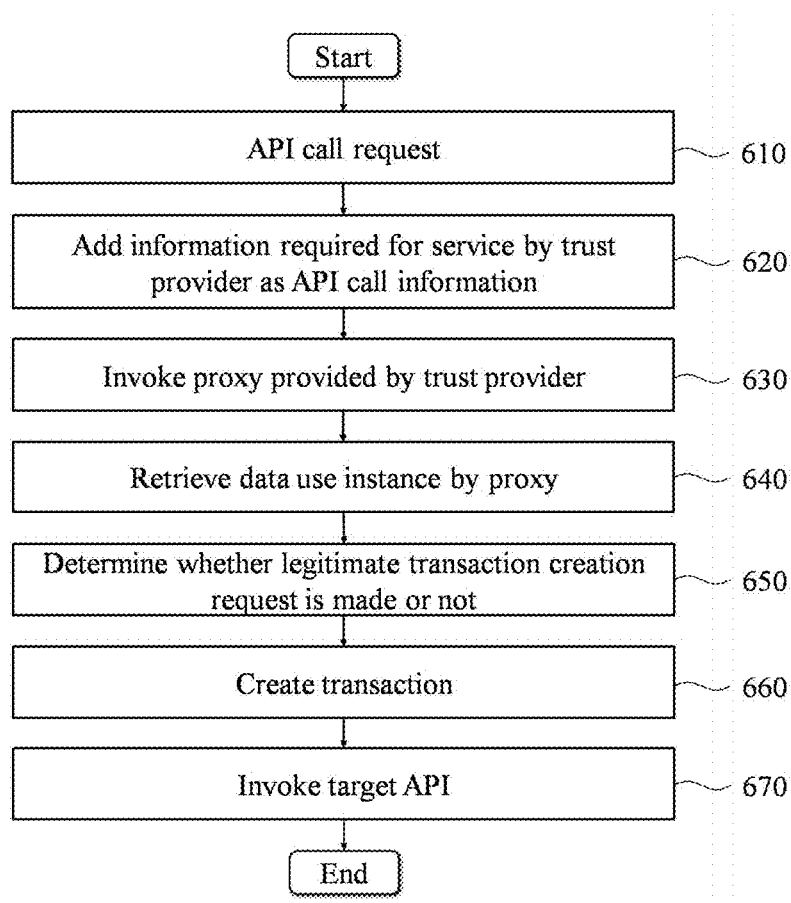
FIG. 6 is a flowchart illustrating an example of a service process for an API call according to an exemplary embodiment of the present invention.

FIG. 6 is a flowchart illustrating an example of a service process for an API call according to an exemplary embodiment of the present invention.

In the step 610, the service provider 320 may request an API call to provide a service relating to the user's information. For example, if the user 310's permission is required, or when invoking a target API using the user 310's information for a service by the service provider 320, the service provider 320 may ask the trust provider 330 for an API call in order for them to provide the service. The target API may refer to an API the service provider 320 actually wants to invoke, and the step 610 may be a step of making an API call request to the trust provider 330 so that the trust provider 330 can invoke a target API after creating a transaction.

In the step 620, the service provider 320 may add information required for the service by the trust provider 330 as API call information. For example, a data use instance, information about the service provider 320, and information about the user 310 may be added as API call information.

In the step 630, the service provider 320 may invoke a proxy provided by the trust provider 330. For example, in order to monitor instances of API use, the form integration module 570 may invoke a proxy provided by the trust provider 330 to record instances of use of pertinent information.

In the step 640, the proxy of the trust provider 330 may retrieve the data use instance. For example, the proxy of the trust provider 330 may retrieve service use instance information provided at the same time as the invoking.

In the step 650, the proxy of the trust provider 330 may determine whether a legitimate transaction creation request is made or not. For example, the proxy of the trust provider 330 may determine whether information requested by the service provider 320 is legitimate or not. Legitimacy may be assessed in various ways. In an example, in terms of form, legitimacy may be determined based on whether the service provider 320 is registered or not, or based on whether the API call route is authorized or not. In terms of content, legitimacy may be determined based on whether the data use instance to be used (recorded) is clear or not, whether they match the information provided to the user 310 by the service provider 320 or not, whether the period of use is specified or not, and/or whether the entity who uses the information is set forth or not.

In the step 660, the proxy of the trust provider 330 may create a transaction. For example, the proxy of the trust provider 330 may record information using an API in a transaction on a blockchain.

In the step 670, the proxy of the trust provider 330 may invoke a target IP. Since a data use instance has been stored using an API, the proxy of the trust provider 330 may complete the API call request in the step 610 by invoking an API required for an actual service by the service provider 320.

Figure 7:
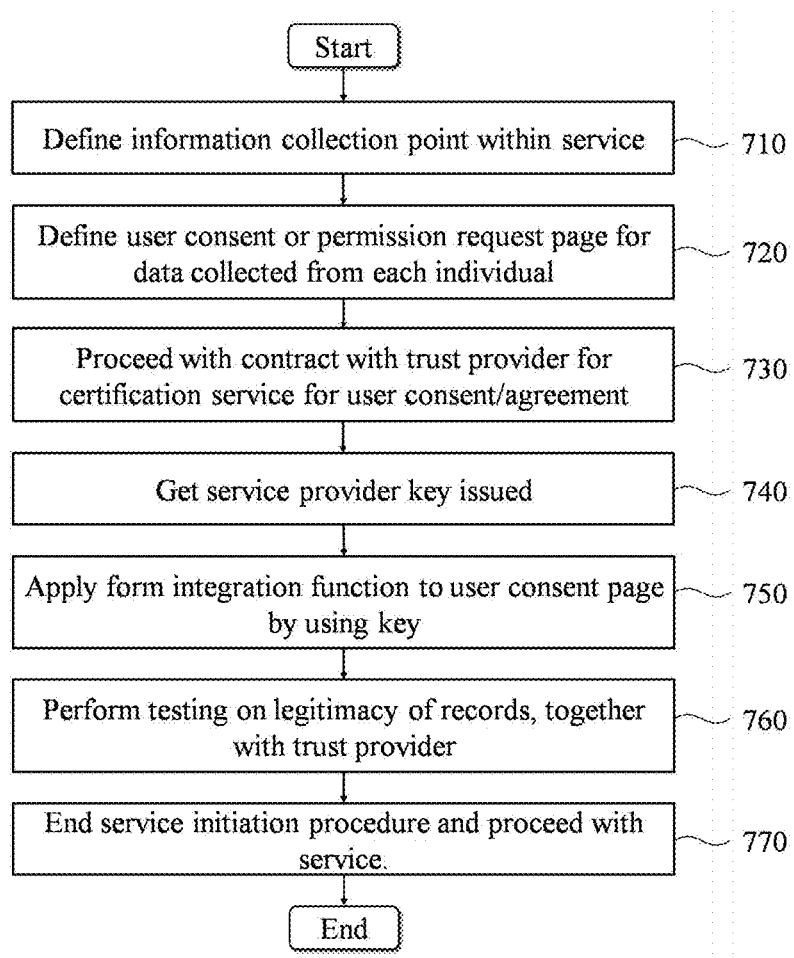
FIG. 7 is a flowchart illustrating an example of a service process applicable to a service provider according to an exemplary embodiment of the present invention.

FIG. 7 is a flowchart illustrating an example of a service process applicable to a service provider according to an exemplary embodiment of the present invention.

In the step 710, the service provider 320 may define an information collection point within a service. In other words, the service provider 320 may define a collection point for information that needs to be collected from the user 310. This information may comprise a one-time permission/agreement that takes place at the time of service use, as well as explicit collected information. Information such as user preferences inferred by artificial intelligence or the like may be explicitly included in the terms and conditions, etc. with user consent.

In the step 720, the service provider 320 may define a user consent or permission request page for data collected from each individual. In other words, the service provider 320 may define a request page for consent or permission (consent or permission for data) collected from the user 320. This page may provide the content of a request by explicitly tagging or labeling it (so that the user can see it), and each piece of content may be checked later through the trust provider 330.

In the step 730, the service provider 320 may proceed with a contract with the trust provider 330 for certification service for the user consent/agreement. A blockchain to be used for certification may be set, and conditions or the like for all nodes of the blockchain may be set. In this case, the trust provider 330 may provide a function for the monitoring and notification of pertinent information to ensure reliability for storing this information. In an example, the above-mentioned blockchain health monitor 540 may provide this monitoring and notification function.

In the step 740, the service provider 320 may get a service provider key issued by the trust provider 330. Using this key, the user 310 may be identified, and, in some embodiments, the key may be issued for each section of the user agreement.

In the step 750, the service provider 320 may apply a form integration function to a user consent page by using the key. The form integration function may be applied to information that is required to be stored by the trust provider 330.

In the step 760, the service provider 320 may perform testing on the legitimacy of records, together with the trust provider 330. Through user testing or A/B testing, the trust provider 330 may monitor whether the agreement received from the user 310 is identical to what is certified by the trust provider 330, and, if this information is properly verified, may notify the user 310 that the personal data collection and storage function is reliable.

In the step 770, the service provider 320 may complete the service initiation procedure and proceed with the service.

As the importance of data protection is increasing, online or mobile service providers (service providers) have to offer users reliability concerning data use. It is very important to provide a function of allowing users to see information relating to data consent and use anytime the user wants, by managing information relating to data consent using a blockchain of a user, service provider, and reliable third-party (trust provider) as a starting point.

In an example, as explained previously, Europe's GDPR requires that "the data processor (service provider) should be able to demonstrate that the data subject has given consent to the processing operation". In the exemplary embodiments of the present invention, a condition for exempting the data processor from demonstrating that the data subject has given consent to the processing operation may be established. Accordingly, data processors using data can share the reliability of personal-data based service use with trust providers.

In an exemplary embodiment, a computer device 200 configured to perform a information management method from the point of view of a trust provider may receive a request to store a user agreement to the processing of the user's information from a trust provider who provides a service to the user, record the user agreement on a blockchain, provide a response to the service provider's request to store the user agreement, receive a request from the user for third-party certification for the provision of information, regarding the information provided to the service provider from the user, and provide the user a third-party certification for the provision of information.

As used herein, the information may comprise at least one of personally identifiable information (PII) and potential personally identifiable information (PPII).

In some embodiments, the computer device 200 may provide a function for looking up transactions recorded on the blockchain by the processor 220. For example, the computer device 200 may create a URL (uniform resource locator) or code for looking up transactions recorded on the blockchain and provide the created URL or code as a service by the service provider or to the user.

Moreover, the computer device 200 may issue the service provider a key for each user or for each section of the user agreement by the processor 220. In this case, a transaction for recording the user agreement on the blockchain may be created by using the issued key.

In addition, the computer device 200 may apply a form integration function to the user agreement by the processor 220. In this case, the form integration function may comprise a function for integrating different forms of user agreement in a web service, API, mobile app, etc.

Furthermore, the computer device 200 may retrieve a data use instance included in API call information, in response to an API call request for a service by the service provider, determine the legitimacy of a transaction creation request from the service provider and record the data use instance using an API if the request is legitimate, and invoke a target API required for the service by the service provider, by the processor 220.

Besides, the computer device 200 may test the legitimacy of the user agreement recorded on the blockchain by comparing the user agreement recorded on the blockchain and the provided information for which the third-party certification was granted, by the processor 220.

In an exemplary embodiment, the computer device 200 configured to perform a information management method from the point of view of a service provider may request a user for the user's information required to use a service, create and provide a trust provider selection page in response to a trust provider association request from the user, identify a trust provider selected through the trust provider selection page, request the identified trust provider to store a user agreement to the processing of the user's information, and grant the user the right to use the service according to a response from the trust provider, by the processor 220.

In some embodiments, the computer device 200 may proceed with a contract with the selected trust provider for certification service for the user consent/agreement, by the processor 220.

Moreover, the computer device 200 may get a key issued by the trust provider for each user or for each section of the user agreement and apply a form integration function to a user consent page by using the key, by the processor 220.

Figure 8:
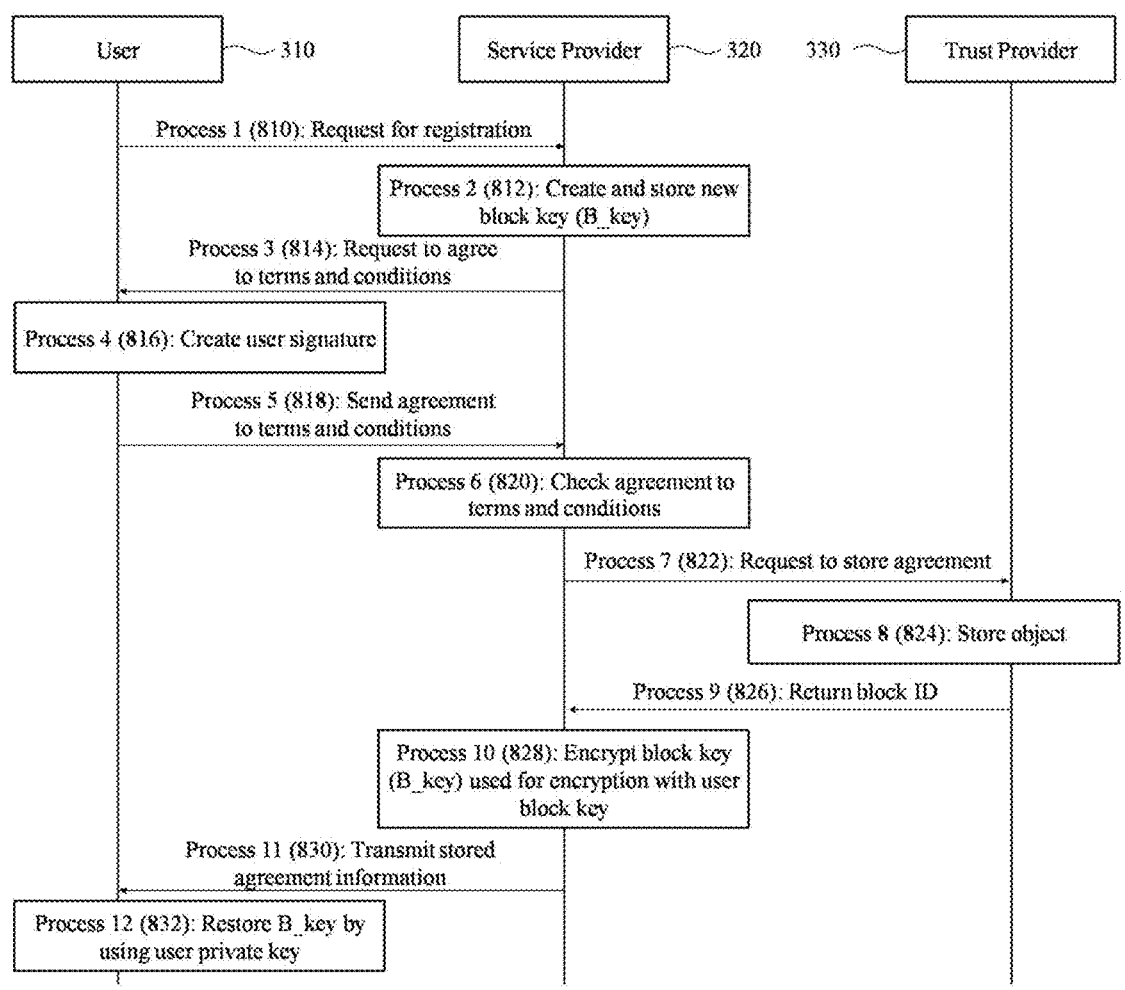
FIGS. 8 and 9 are views illustrating an example of a service flow for agreeing to terms and conditions and checking the agreement to the terms and conditions according to an exemplary embodiment of the present invention.
Figure 9:
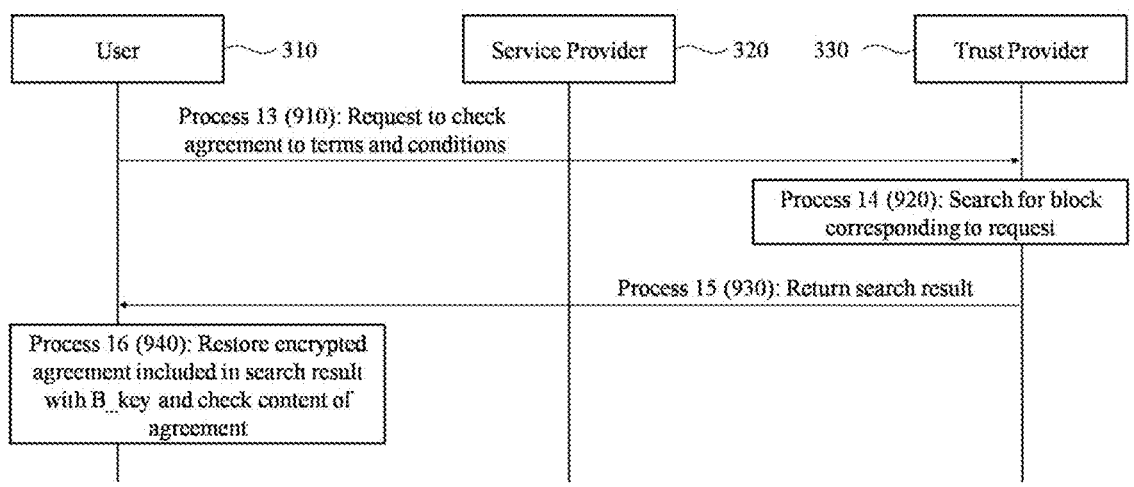

FIGS. 8 and 9 are views illustrating an example of a service flow for agreeing to terms and conditions and checking the agreement to the terms and conditions according to an exemplary embodiment of the present invention.

The exemplary embodiment of FIG. 8 shows an example of a process in which the user 310 registers for a service by the service provider 320 and stores the user's agreement to the terms and conditions through the trust provider 330.

In the first process 810, the user 310 may ask the service provider 320 to have them register. In this case, it is assumed that the user 310 creates and owns a pair of keys comprising a public key and a private key.

In the second process 812, the service provider 320 may create and store a block key (B_key).

In the third process 814, the service provider 320 may request the user 310 to agree to the terms and conditions. In this case, if there exits a block identifier (Block ID) for the user 310's previous agreement, the value of the identifier of this block may be included in the request. The identifier of the block for the previous agreement will be described later in further details.

In the fourth process 816, the user 310 may check the terms and conditions and then create a user signature. For example, a physical terminal of the user 310, which virtually corresponds to the user 310, may create a user signature by displaying the terms and conditions and then signing the agreement with the private key according to an agreement request appearing with the displayed terms and conditions.

In the fifth process 818, the user 310 may send the agreement to the terms and conditions to the service provider 320. In this case, the user 310 may send the user signature and the public key of the user 310 to the service provider 320, as well as the agreement to the terms and conditions.

In the sixth process 820, the service provider 320 may check the received agreement to the terms and conditions. In this case, the service provider 320 may sign the checked agreement by the service provider 320's private key (RC private key), and may encrypt the checked agreement by using the block key created and stored in the second process 814.

In the seventh process 822, the service provider 320 may ask the trust provider 330 to store the agreement. In this case, the service provider 320 may send the agreement encrypted with the block key and the agreement signed with the private key of the service provider 320 to the trust provider 330.

In the eighth process 824, the service provider 320 may store a received object. The object may comprise the agreement encrypted with the block key and the agreement signed with the private key of the service provider 320, and may be stored on a blockchain managed by the trust provider 330.

In the ninth process 826, the trust provider 330 may return the aforementioned block identifier (Block ID) to the service provider 320. Afterwards, the trust provider 330 may store the block identifier in a separate table by using [service provider 320, user 310] as a key.

In the tenth process 828, the service provider 320 may encrypt the block key used for encryption with the public key of the user 310. The block identifier may be stored separately by the service provider 320.

In the eleventh process 830, the service provider 320 may transmit stored agreement information to the user 310. The stored agreement information may comprise the block identifier returned from the trust provider 330 in the ninth process 826 and the block key encrypted in the tenth process 828. Also, the service provider 320 may store the block identifier.

In the twelfth process 832, the user 310 may restore the encrypted block key with the private key of the user 310.

The exemplary embodiment of FIG. 9 shows an example of a process in which the user 310 checks the stored agreement through the trust provider 330.

In the thirteenth process 910, the user 310 may ask the trust provider 330 to check the agreement to the terms and conditions. In this case, since only one agreement was given to the terms and conditions, this agreement has been stored in the blockchain managed by the trust provider 330 through the block corresponding to the block identifier received in the eleventh process 830. Accordingly, the user 310 may ask the trust provider 330 for the content of the block through the block identifier to check the agreement to the terms and conditions.

In the fourteenth process 920, the trust provider 330 may search for the block corresponding to the request. For example, the trust provider 330 may search for the block corresponding to the identifier of the block in which the request is included.

In the fifteen process 930, the trust provider 330 may return a search result to the user 310. The search result is the content of the block, and, as explained previously, may comprise an agreement encrypted with the block key and an agreement signed with the private key of the service provider 320.

In the sixteenth process 940, the user 330 may restore the encrypted agreement included in the returned search result with the block key and check the content of the agreement. Here, the block key may be the block key restored in the twelfth process 832 of FIG. 8. The agreement signed with the private key of the service provider 320 which the search result further comprises may be used to confirm the validity of the content of the restored agreement.

Figure 10:
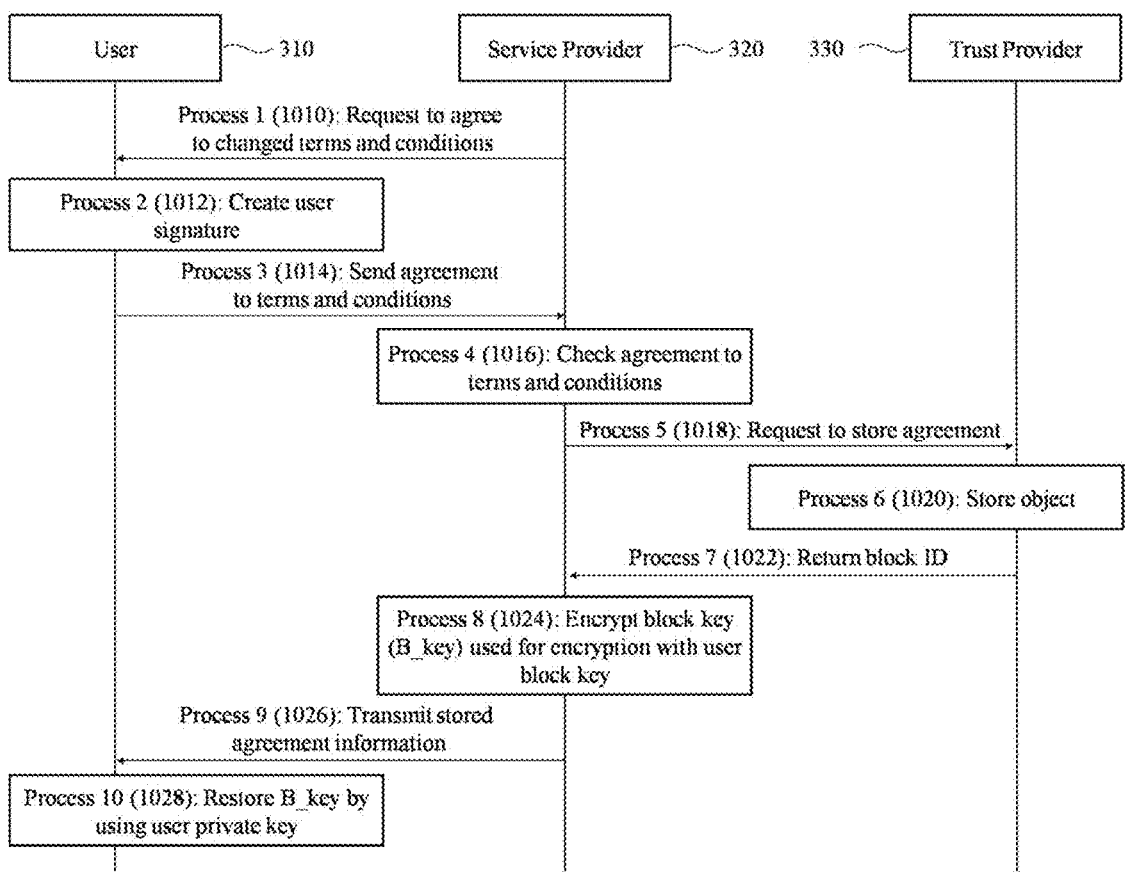
FIGS. 10 and 11 are views illustrating an example of a service flow for agreeing to changed terms and conditions and checking the agreement to the terms and conditions according to an exemplary embodiment of the present invention.
Figure 11:
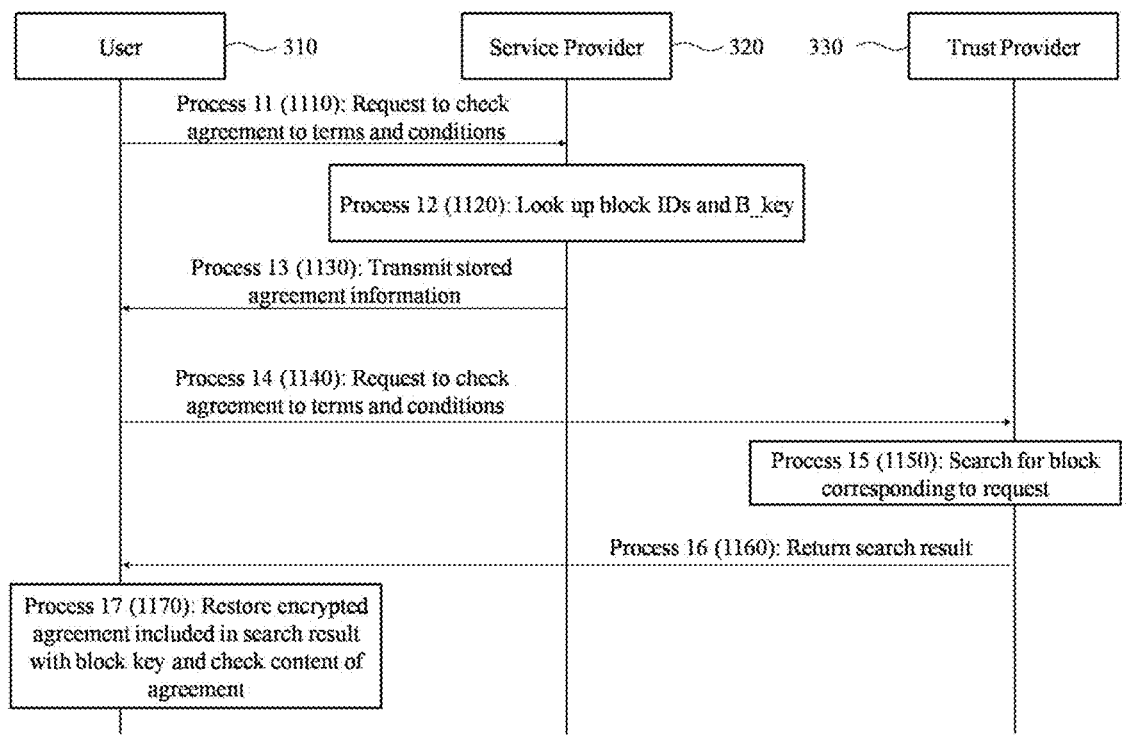

FIGS. 10 and 11 are views illustrating an example of a service flow for agreeing to changed terms and conditions and checking the agreement to the terms and conditions according to an exemplary embodiment of the present invention.

The exemplary embodiment of FIG. 10 shows an example of a process of updating terms and conditions.

In the first process 1010, the service provider 320 may request the user 310 to agree to changed terms and conditions. In this case, if there exists a block identifier for previously agreed terms and conditions, the block identifier may be included in the request.

In the second process 1012, the user 310 may check the changed terms and conditions and then create a signed agreement. For example, a physical terminal of the user 310, which virtually corresponds to the user 310, may create a user signature by displaying the changed terms and conditions and then signing the agreement with the private key according to an agreement request appearing with the displayed terms and conditions.

In the third process 1014, the user 310 may send the agreement to the changed terms and conditions to the service provider 320. The sent agreement may comprise a user signature.

In the fourth process 1016, the service provider 320 may check the received agreement to the terms and conditions. In this case, the service provider 320 may sign the checked agreement with the service provider 320's private key, and may encrypt the checked agreement with the block key created and stored in the second process 814 shown previously in FIG. 8.

In the fifth process 1018, the service provider 320 may ask the trust provider 330 to store the agreement. In this case, the service provider 320 may send the agreement encrypted with the block key and the agreement signed with the private key of the service provider 320 to the trust provider 330.

In the sixth process 1020, the service provider 320 may store a received object. The object may comprise the agreement encrypted with the block key and the agreement signed with the private key of the service provider 320, and may be stored on a blockchain managed by the trust provider 330.

In the seventh process 1022, the trust provider 330 may return the aforementioned block identifier (Block ID) to the service provider 320. Afterwards, the trust provider 330 may store the block identifier in a separate table by using [service provider 320, user 310] as a key.

In the eighth process 1024, the service provider 320 may encrypt the block key used for encryption with the public key of the user 310. The block identifier may be stored separately by the service provider 320.

In the ninth process 1026, the service provider 320 may transmit stored agreement information to the user 310. The stored agreement information may comprise the block identifier returned from the trust provider 330 in the seventh process 922 and the block key encrypted in the eighth process 924. Also, the service provider 320 may store the block identifier.

In the tenth process 1028, the user 310 may restore the encrypted block key with the private key of the user 310.

The exemplary embodiment of FIG. 11 shows an example of a process of checking the agreement to the terms and conditions.

In the eleventh process 1110, the user 310 may ask the service provider to check the agreement to the terms and conditions. In this case, since only one agreement was given to the terms and conditions in the thirteenth process 834 of FIG. 8, the trust provider 330 may be directly asked to check the agreement to the terms and conditions by using the identifier of the block in which the agreement is stored, whereas, in the exemplary embodiment of FIG. 9, the service provider 320 may be asked first to check the agreement to the terms and conditions because the agreement comprise a plurality of agreements.

In the twelfth process 1120, the service provider 320 may look up the block key of the user 310 and the identifiers of blocks. While there is only one block key for the corresponding terms and conditions, there are respective blocks for the initial terms and conditions and the changed terms and conditions, and therefore there may be a plurality of block identifiers. Lookup results may be encrypted with the public key.

In the thirteenth process 1130, the service provider 320 may transmit stored agreement information to the user 310. The stored agreement information may comprise information about the encryption of the block key and block identifiers found in the twelfth process 1120 with the public key of the user 310.

In the fourteenth process 1140, the user 310 may ask the trust provider 330 to check the agreement to the terms and conditions by using a block identifier. In an example, the user 310 may restore the stored agreement information transmitted in the thirteenth process 1130 using the private key of the user 310, and then select the agreement to the terms and conditions they want to check. The selection of agreement may be done by the block identifier. In other words, the user 310 may ask the trust provider 330 to check the agreement to the terms and conditions by using the identifier of the selected block.

In the fifteenth process 1150, the trust provider 330 may search for the block corresponding to the request. For example, the trust provider 330 may search for the block corresponding to the identifier of the block in which the request is included.

In the sixteenth process 1160, the trust provider 330 may return a search result to the user 310. The search result is the content of the block, and, as explained previously, may comprise an agreement encrypted with the block key and an agreement signed with the private key of the service provider 320.

In the seventeenth process 1170, the user 330 may restore the encrypted agreement included in the returned search result with the block key and check the content of the agreement. Here, the block key may be the block key restored in the tenth process 1028 or the block key transmitted in the thirteenth process 1130. The agreement signed with the private key of the service provider 320 which the search result further comprises may be used to confirm the validity of the content of the restored agreement.

The format of raw data stored by the trust provider 330 may be shown in the following Table 1, and the format of data stored in a block the trust provider 330 adds to the blockchain may be shown in the following Table 2:

TABLE 1

```
rawData{
    user: {
            id: "string",
            agreement: {"1": {principal: "string", content: "string", state: "boolean" }, ... }},
            signature: "string",
            publicKey: "string" (PEM Format),
    }, rightConsumer: {
            name: "string",
            signature: "string",
            publicKey: "string" (PEM Format)
        }
}
```

The raw data format in Table 1 is a JavaScript Object Notation (JSON) format, and "user" may correspond to the user 310 and the rightConsumer" to the service provider 320. "id" of "user" may mean the identifier of the user 310, "agreement" may mean an agreement sent by the user 310, "signature" may mean a user signature, and "publicKey" may mean the public key of the user 310. Also, "name" in "rightConsumer" may mean the name of the service provider 320, "signature" may mean an agreement signed with the private key of the service provider 320, and "publicKey" may mean the public key of the service provider 320. "PEM Format" may mean that the public key is in PEM format.

TABLE 2

```
rawData{
    encryptedData: "string",
    regDatetime: "string" (YYYY-MM-DD hh:mm),
    prevBlockNum: "int"
}
```

As used herein, "encryptedData" may mean encrypted data that is generated by encrypting the above raw data in Table 1 with a block key. Also, "regDatatime" may mean the point in time at which the corresponding block is added to the blockchain, and "prevBlockNum" may mean the number of the previous block.

Figure 12:
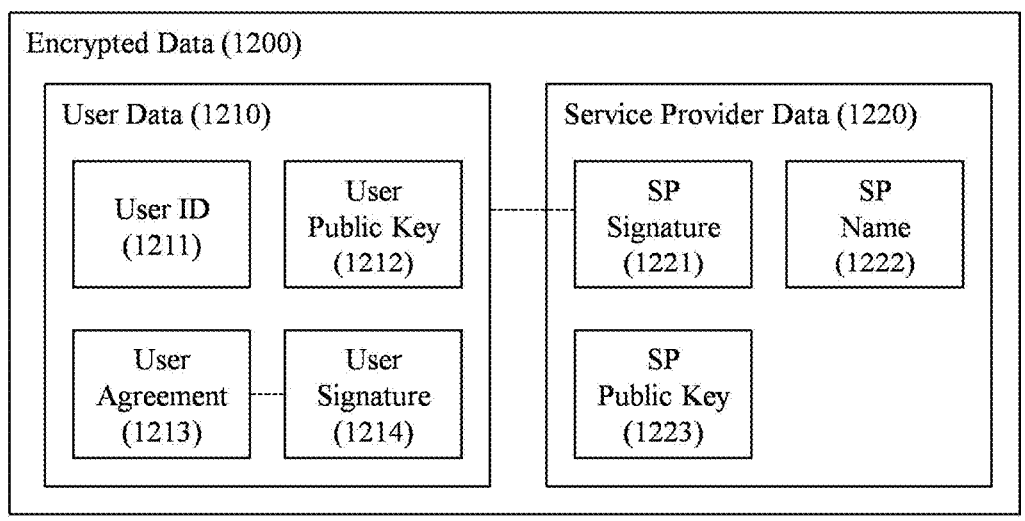
FIG. 12 is a view illustrating an example of encrypted information included in a block added to a blockchain according to an exemplary embodiment of the present invention.

FIG. 12 is a view illustrating an example of encrypted information included in a block added to a blockchain according to an exemplary embodiment of the present invention. FIG. 12 shows an example of data included as encrypted data (e.g., "encryptedData" 1200 in Table 2) included in a block added to a blockchain of the trust provider 330. The encrypted data 1200 may comprise user data 1210 and service provider data 1220. The user data 1210 may comprise a user ID 1211, a user public key 1212, a user agreement 1213, and a user signature 1214. Here, the user signature 1214 may be a signature signed on the user agreement 1213 with the private key of the user 310. Also, the service provider data 1220 may comprise a service provider (SP) signature 1221, a service provider (SP) name 1222, and a service provider (SP) public key 1223. Here, the service provider signature 1221 may be a signature signed on the user data 1210 with the private key of the service provider 320.

Figure 13:
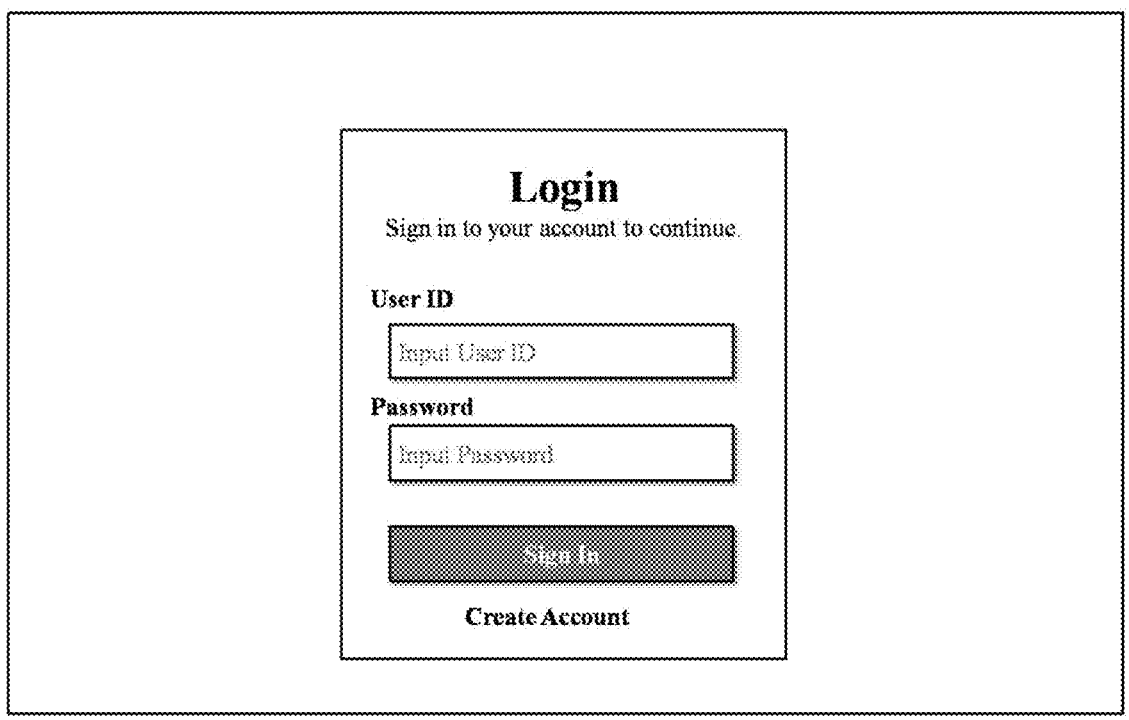
FIG. 13 is a view illustrating an example of a main page of a service that requires logging in according to an exemplary embodiment of the present invention.

FIG. 13 is a view illustrating an example of a main page of a service that requires logging in according to an exemplary embodiment of the present invention. The login page of FIG. 13 may require a user to log in by entering the user ID and password. Also, it may provide a function for creating an account.

FIG. 14 is a view illustrating an example of a registration page according to an exemplary embodiment of the present invention. The registration page of FIG. 14 may provide a function for prompting a user to enter a user ID, a user name (your name), and password in order to have the user register as a member.

FIG. 15 is a view illustrating an example of a page for agreement to terms and conditions according to an exemplary embodiment of the present invention. The page for agreement to terms and conditions shown in FIG. 15 may provide a function for prompting a logged-in user to select and agree to the terms and conditions the service provider is asking the user to agree. Once the terms and conditions the service provider is asking the user to agree are selected, the selected terms and conditions of the service provider may appear on the page of FIG. 15, as shown in FIG. 15. In this case, the user may select sections they want and then register agreement to the terms and conditions.

Figure 16:
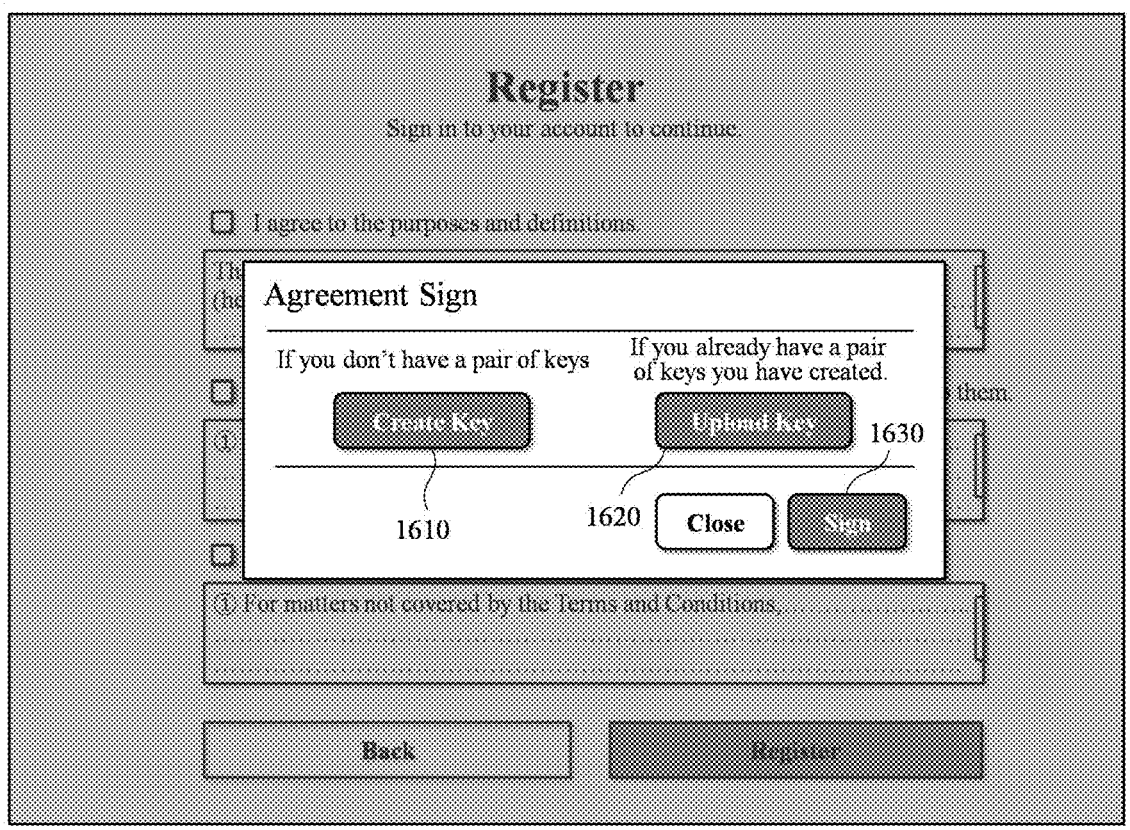
FIG. 16 is a view illustrating an example of a process of creating or uploading a pair of keys according to an exemplary embodiment of the present invention.

FIG. 16 is a view illustrating an example of a process of creating or uploading a pair of keys according to an exemplary embodiment of the present invention. As explained above, the agreement to the terms and conditions may be signed with the user's private key. To this end, a pair of keys including a public key and a private key need to be created for the user. The page of FIG. 16 shows a function 1610 for creating a pair of keys if the user doesn't have a pair of keys, a function 1620 for uploading the pair of keys if the user already has a pair of keys, and a function 1630 for creating a user signature by signing the user's agreement to the terms and conditions with the user's private key.

Figure 17:
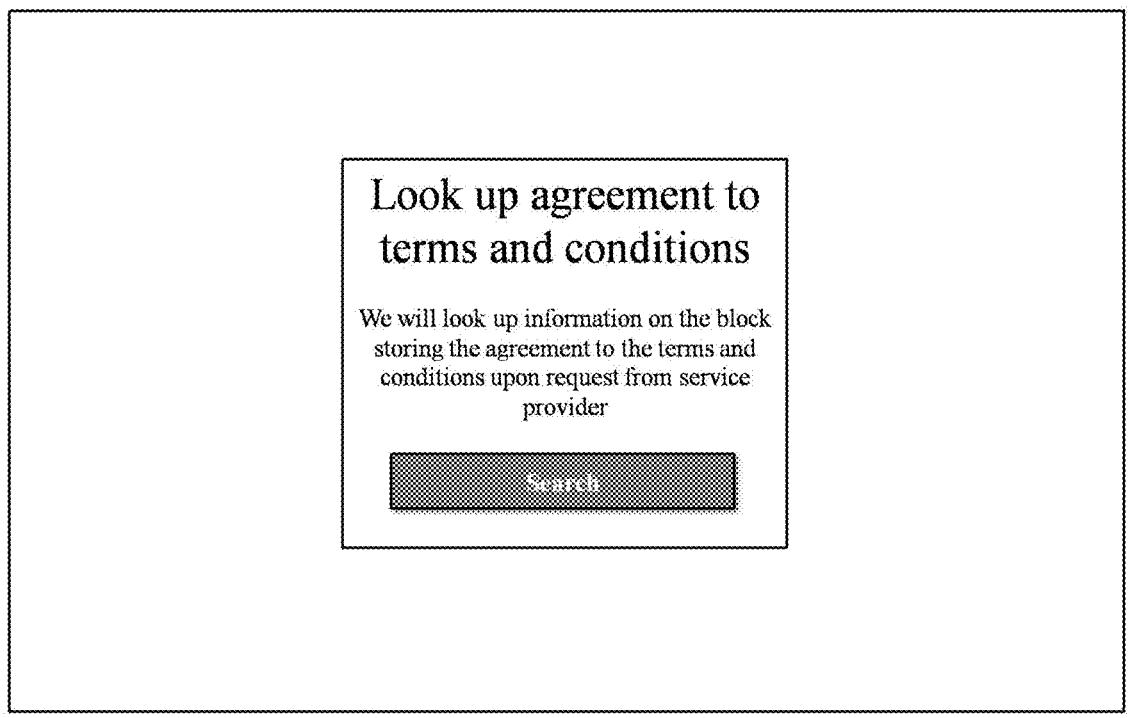
FIG. 17 is a view illustrating a function for looking up agreement to terms and conditions.

FIG. 17 is a view illustrating a function for looking up agreement to terms and conditions. As explained previously, if a user agrees to the service provider's terms and conditions, the user's agreement may be stored through a blockchain of the trust provider. The page of FIG. 17 may comprise a function for looking up the user's agreement.

Figure 18:
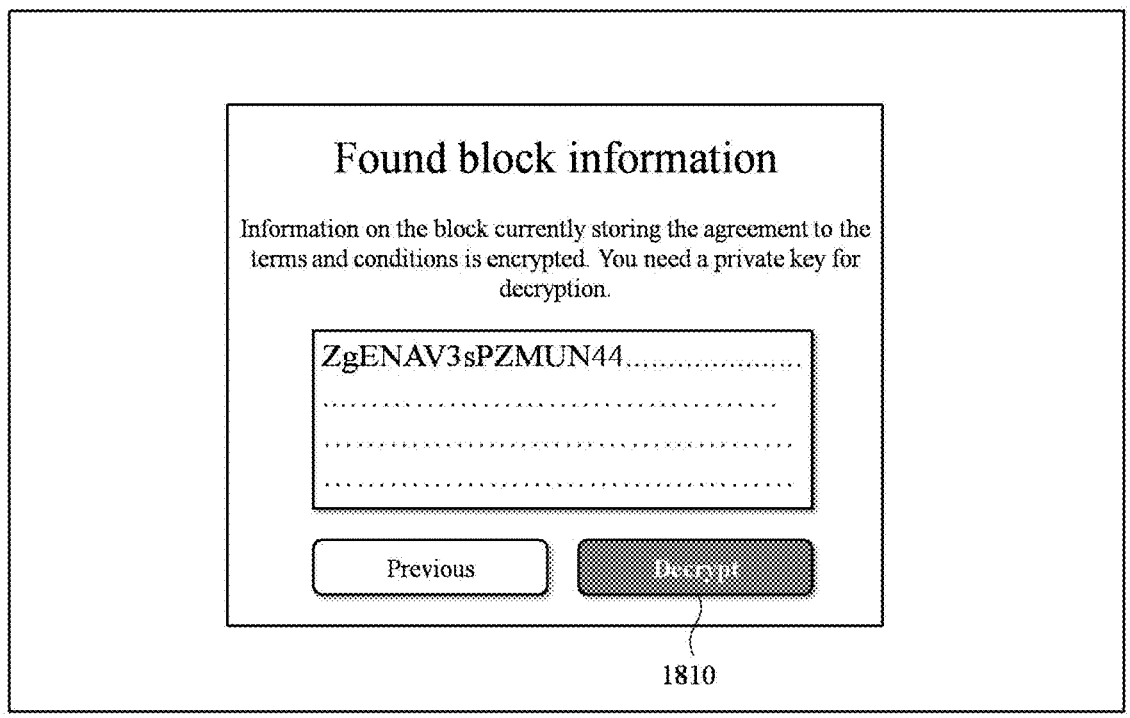
FIGS. 18 and 19 are views illustrating an example of displaying found block information according to an exemplary embodiment of the present invention.
Figure 19:
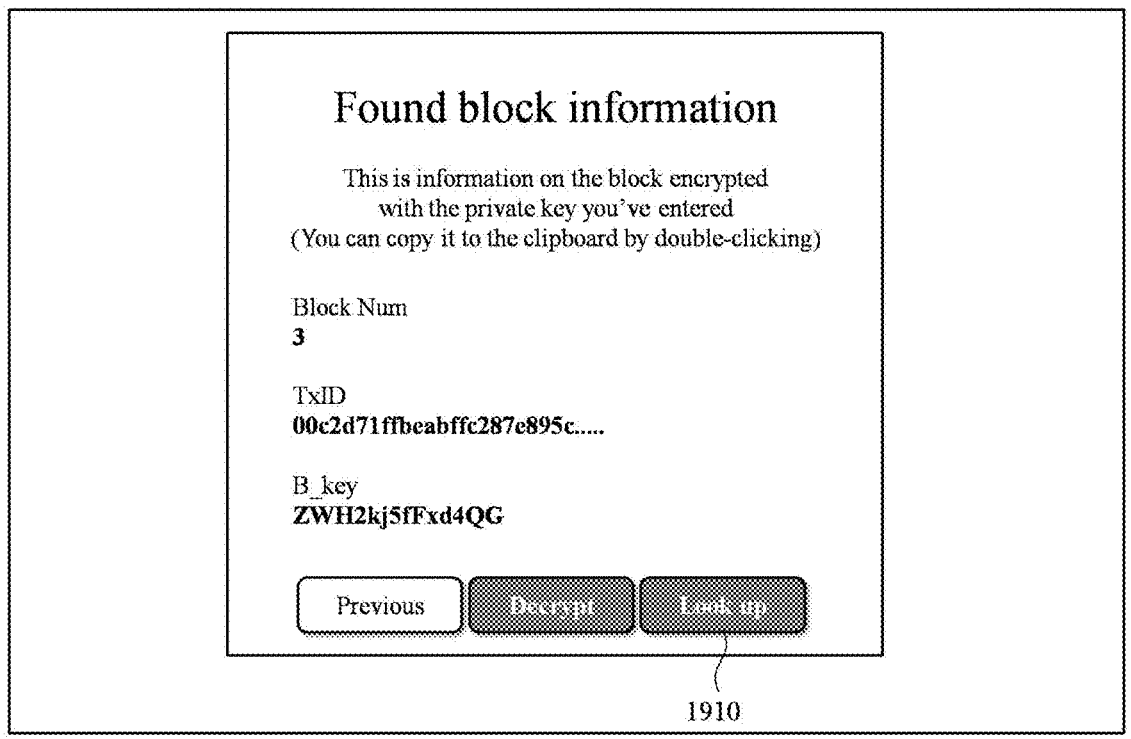

FIGS. 18 and 19 are views illustrating an example of displaying found block information according to an exemplary embodiment of the present invention. If the user looks up agreement to the terms and conditions through the page of FIG. 17, found block information may be displayed as shown on the page of FIG. 18. In this case, in order to provide the corresponding block information only to the corresponding user, the block information may be encrypted with the public key of the user. The user may restore the block information with the user's private key by using a restoration function 1810 of FIG. 18. FIG. 19 shows the block identifier (Block Num), transaction identifier (TxID), and block key (B_key) as the restored block information. Also, the page of FIG. 19 may comprise a function 1910 for looking up the terms and conditions for the block.

Figure 20:
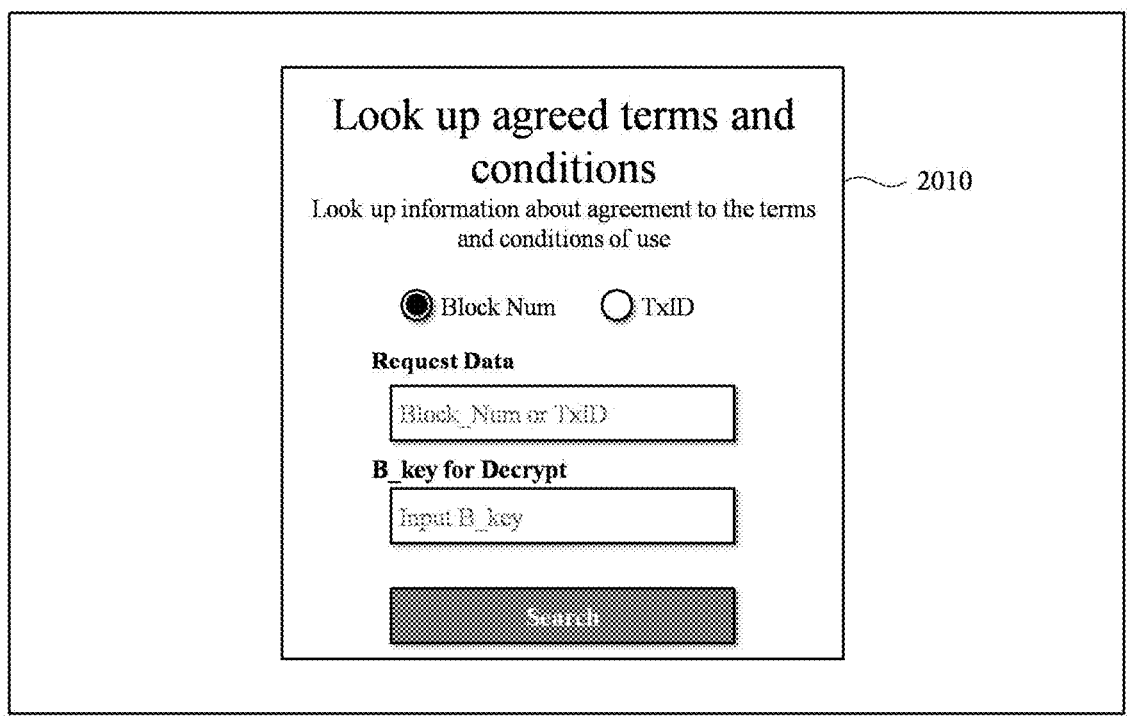
FIG. 20 is a view illustrating an example of a function for looking up agreed terms and conditions according to an exemplary embodiment of the present invention.

FIG. 20 is a view illustrating an example of a function for looking up agreed terms and conditions according to an exemplary embodiment of the present invention. The page of FIG. 20 shows a popup window 2010 provided by the trust provider to look up agreed terms and conditions. The user may look up terms and conditions they want, among all of the terms and conditions they agreed to, by entering a block identifier or transaction identifier and a block key.

Figure 21:
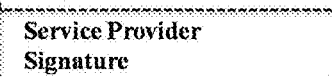
FIG. 21 is a view illustrating an example of displaying stored agreement information according to an exemplary embodiment of the present invention.

FIG. 21 is a view illustrating an example of displaying stored agreement information according to an exemplary embodiment of the present invention. The page of FIG. 21 shows an example of displaying the content of found terms and conditions. The exemplary embodiment of FIG. 21 shows an example in which the user agreed to "the effect of the terms and conditions and changes made to them" but did not agree to "the purposes and definitions" and "the regulations as well as the terms and conditions". Meanwhile, the page of FIG. 2 may comprise a function 2110 for authenticating the validity of the agreement to the terms and conditions by verifying the service provider's signature and the user signature.

FIGS. 22 and 23 are views illustrating an agreement to initial terms and conditions and an agreement to changed terms and conditions according to an exemplary embodiment of the present invention. The page of FIG. 22 shows an example of displaying initially agreed terms and conditions as an instance of agreement, and the page of FIG. 23 shows an example of displaying changed terms and conditions as an instance of agreement. It can be seen that the agreement to the initial terms and conditions was stored in the block identifier (Block Num) '4', and the agreement to the changed terms and conditions was stored in the block identifier '5'. Also, it can be seen that the user agreed to "the effect of the terms and conditions and changes made to them" but did not agree to "the purposes and definitions" and "the regulations as well as the terms and conditions", and agreed to all of the sections in the changed terms and conditions.

As seen from above, according to the exemplary embodiments of the present invention, consent for and use of information may be managed using a blockchain. In particular, a service provider is able to demonstrate whether a user has given consent to the processing of information by managing consent for and use of the user's information using a reliable blockchain technology of a trust provider.

The system or device described above may be realized by hardware elements, software elements and/or combinations thereof. For example, the devices and components described in the exemplary embodiments may be implemented in one or more general-use computers or special-purpose computers, such as a processor, a controller, an arithmetic logic unit (ALU), a digital signal processor, a microcomputer, a field programmable gate array (FPGA), a programmable logic unit (PLU), a microprocessor or any device which may execute instructions and respond. A processing unit may process an operating system (OS) or one or more software applications running on the OS. Further, the processing unit may access, store, manipulate, process, and generate data in response to software execution. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof, and may configure a processing unit to operate in a desired manner or may independently or collectively control the processing unit. Software and/or data may be permanently or temporarily embodied in any type of machine, components, physical equipment, virtual equipment, or computer storage media or units so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments may be implemented with program instructions which may be executed through various computer means, and may be recorded in computer-readable media. The computer-readable media may also include, alone or in combination, the program instructions, data files, data structures, and the like. The media may persistently store a computer-executable program or temporarily store the computer-executable program for execution or downloading. The media may be various recording means or storage means formed by a single piece of hardware or a combination of several pieces of hardware. The media are not limited to media directly connected to a certain computer system, but may be distributed over a network. Examples of the media may be those configured to store program instructions, including magnetic media such as hard disks, floppy disks, and magnetic tapes, optical media such as CD-ROMs and DVDs, and magneto-optical media such as floptical disks, ROM, RAM, and flash memory. Furthermore, other examples of the medium may include an app store in which apps are distributed, a site in which other various pieces of software are supplied or distributed, and recording media and/or store media managed in a server. Examples of the program instructions may include machine-language code, such as code written by a compiler, and high-level language code executable by a computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

What is claimed is:

1. An information management method for a computer device comprising at least one processor, the method comprising:
   receiving, by the at least one processor, a request to store a user agreement regarding a processing of the user's information from a service provider providing a service to the user by receiving the user agreement encrypted with a block key from the service provider;
   recording, by the at least one processor, the user agreement on a blockchain;
   providing, by the at least one processor, the service provider with a response to the request to store the user agreement by returning an identifier of a block corresponding to the user agreement recorded on the blockchain to the service provider;
   receiving, by the at least one processor, a third-party certification request for provision of information from the user, regarding the information provided to the service provider; and
   providing, by the at least one processor, a third-party certification for the provision of information to the user,
   wherein the receiving of the storage request comprises receiving, from the service provider, a signature of the service provider signed on the user agreement with a private key of the service provider and a signature of the user signed on the user agreement with a private key of the user are received, and
   wherein the providing of the third-party certification comprises providing the third-party certification for the provision of information using the signature of the service provider and the signature of the user.

2. The information management method of claim 1, further comprising: providing a function for looking up transactions recorded on the blockchain, by the at least one processor.

3. The information management method of claim 2, wherein, in the providing of the look up function, at least one among an API for looking up transactions recorded on the blockchain, a page, a URL (uniform resource locator) for accessing the page, and a code are provided as a service by the service provider or provided to the user.

4. The information management method of claim 1, further comprising:

issuing the service provider a key for each user or for each section of the user agreement, by the at least one processor, wherein a transaction for recording the user agreement on the blockchain is created using the issued key.

5. The information management method of claim 1, further comprising:

applying a form integration function to the user agreement, by the at least one processor, wherein the form integration function comprises a function for integrating different forms of user agreement in a particular application, wherein the application is a web service, API, or a mobile app.

6. The information management method of claim 1, further comprising:

retrieving a data use instance included in API call information, in response to an API call request for a service by the service provider, by the at least one processor;

determining the legitimacy of a transaction creation request from the service provider and recording the data use instance using an API if the request is legitimate, by the at least one processor; and invoking a target API required for the service by the service provider, by the at least one processor.

7. The information management method of claim 1, further comprising: testing a legitimacy of the user agreement recorded on the blockchain by comparing the user agreement recorded on the blockchain and the provided information for which the third-party certification was granted, by the at least one processor.

8. An information management method for a computer device comprising at least one processor, the method comprising:

requesting, by the at least one processor, a user for the user's information required to use a service;

creating, by the at least one processor, and providing a trust provider selection page in response to a trust provider association page from the user;

identifying, by the at least one processor, a trust provider selected through the trust provider selection page;

requesting, by the at least one processor, the identified trust provider to store a user agreement regarding a processing of the user's information; and granting, by the at least one processor, the user the right to use the service according to a response from the trust provider, wherein the requesting to store the user agreement comprises:

receiving a user agreement to terms and conditions from the user and the user's signature on the user agreement;

encrypting the user agreement with a block key created for the terms and conditions;

requesting the trust provider to store the encrypted user agreement; and receiving, from the trust provider, an identifier of a block in which the encrypted user agreement is stored, and wherein the requesting to store the user agreement further comprises transmitting, to the trust provider, a signature of the service provider signed on the user agreement with a private key of the service provider, and the signature of the service provider and a signature of the user signed on the user agreement with a private key of the user are used for providing a third-party certification for provision of information provided to the service provider from the user in the trust provider.

9. The information management method of claim 8, further comprising: proceeding with a contract with the selected trust provider for certification service for the user agreement, by the at least one processor.

10. The information management method of claim 8, wherein the requesting to store the user agreement comprising: getting a key issued by the trust provider for each user or for each section of the user agreement and applying a form integration function to a user consent page by using the issued key.

11. A compute device comprising at least one processor configured to execute computer-readable instructions, wherein the at least one processor is configured to:

receive a request to store a user agreement regarding a processing of the user's information from a service provider providing a service to the user by receiving the user agreement encrypted with a block key from the service provider;

record the user agreement is recorded on a blockchain;

provide the service provider with a response to the request to store the user agreement by returning an identifier of a block corresponding to the user agreement recorded on the blockchain to the service provider;

receive a third-party certification request for provision of information from the user, regarding the information provided to the service provider; and provide a third-party certification for the provision of information to the user, wherein the at least one processor is configured to receive, from the service provider, a signature of the service provider signed on the user agreement with a private key of the service provider and a signature of the user signed on the user agreement with a private key of the user are received, and the at least one processor is configured to provide the third-party certification for the provision of information using the signature of the service provider and the signature of the user.

12. The computer device of claim 11, wherein a function for looking up transactions on the blockchain is provided by the at least one processor.

13. The computer device of claim 11, wherein the service provider is issued a key for each user or for each section of the user agreement by the at least one processor, and a transaction for recording the user agreement on the blockchain is created using the issued key, by the at least one processor.

* * * * *